US011995305B2

(12) United States Patent
Chun et al.

(10) Patent No.: US 11,995,305 B2
(45) Date of Patent: May 28, 2024

(54) PREDICTIVE PRESENTATION OF A USER INTERFACE ON AN EXTENDIBLE DISPLAY

(71) Applicant: Samsung Electronics Co., Ltd., Gyeonggi-do (KR)

(72) Inventors: Jaebong Chun, Gyeonggi-do (KR); Dongil Son, Gyeonggi-do (KR); Hyuncheol Jin, Gyeonggi-do (KR); Hyoseok Na, Gyeonggi-do (KR); Gun Lim, Gyeonggi-do (KR); Chihyun Cho, Gyeonggi-do (KR); Hochul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/133,673

(22) Filed: Apr. 12, 2023

(65) Prior Publication Data

US 2023/0259268 A1    Aug. 17, 2023

Related U.S. Application Data

(63) Continuation of application No. PCT/KR2021/013607, filed on Oct. 5, 2021.

(30) Foreign Application Priority Data

Oct. 13, 2020    (KR) .................. 10-2020-0131998

(51) Int. Cl.
*G06F 3/0487* (2013.01)
*G06F 1/16* (2006.01)
(Continued)

(52) U.S. Cl.
CPC .......... *G06F 3/0487* (2013.01); *G06F 1/1652* (2013.01); *G06F 3/0481* (2013.01); *G06F 9/451* (2018.02); *G06F 2203/04803* (2013.01)

(58) Field of Classification Search
CPC .... G06F 3/0487; G06F 1/1652; G06F 3/0481; G06F 9/451; G06F 2203/04803
See application file for complete search history.

(56) References Cited

U.S. PATENT DOCUMENTS 8,711,566 B2    4/2014 O'Brien
9,041,648 B2    5/2015 Lee et al.
(Continued)

FOREIGN PATENT DOCUMENTS

CN            111104086 A    5/2020
KR    10-2015-0015655 A    2/2015
(Continued)

*Primary Examiner* — Asher D Kells
(74) *Attorney, Agent, or Firm* — Cha & Reiter, LLC

(57) ABSTRACT

An electronic device and method in the same are disclosed. The electronic device includes a first and second housing, the second movable relative to the first, a flexible display having an exposure area configurable into a first size and a larger, second size, at least one sensor, and a processor. The processor implements the method, including: when detecting that the device is disposed in the first state, displaying a first content, based on detecting a first input, displaying a user interface (UI0 with the first content, based on detecting a second input to the UI, cancelling display of the UI, based on detecting a switch from the first state to the second state, maintaining display of the first content in a first area of the exposure area and displaying a second content in a second area of the exposure area.

19 Claims, 26 Drawing Sheets

(51) Int. Cl.
    *G06F 3/0481*        (2022.01)
    *G06F 9/451*         (2018.01)

(56) References Cited

U.S. PATENT DOCUMENTS

| | | | |
|---|---|---|---|
| 9,262,059 | B2 | 2/2016 | Kim et al. |
| 10,001,809 | B2 | 6/2018 | Seo et al. |
| 10,452,156 | B2 | 10/2019 | Kang et al. |
| 10,860,201 | B2 | 12/2020 | Kang et al. |
| 2013/0275910 | A1* | 10/2013 | Kim .................. G06F 1/1652 |
| | | | 715/800 |
| 2014/0204037 | A1* | 7/2014 | Kim .................. G06F 3/03 |
| | | | 345/173 |
| 2014/0340299 | A1* | 11/2014 | Lee .................. G06F 3/147 |
| | | | 345/156 |
| 2016/0154536 | A1 | 6/2016 | Kim et al. |
| 2017/0061932 | A1* | 3/2017 | Kwon .................. G06F 1/1626 |
| 2017/0147189 | A1* | 5/2017 | Ryu .................. G06F 3/04886 |
| 2018/0275770 | A1* | 9/2018 | Kang .................. G09G 3/20 |
| 2018/0284964 | A1* | 10/2018 | Kang .................. H04M 1/0268 |
| 2020/0117285 | A1 | 4/2020 | Seo et al. |
| 2021/0195009 | A1* | 6/2021 | Choi .................. H04M 1/0237 |
| 2022/0253103 | A1* | 8/2022 | Choi .................. G09F 9/301 |

FOREIGN PATENT DOCUMENTS

| | | | |
|---|---|---|---|
| KR | 10-2017-0024942 | A | 3/2017 |
| KR | 10-2017-0038308 | A | 4/2017 |
| KR | 10-2017-0043374 | A | 4/2017 |
| KR | 10-2017-0050270 | A | 5/2017 |
| KR | 10-2017-0060519 | A | 6/2017 |
| KR | 10-2047690 | B1 | 11/2019 |
| KR | 10-2206948 | B1 | 1/2021 |

* cited by examiner

PREDICTIVE PRESENTATION OF A USER INTERFACE ON AN EXTENDIBLE DISPLAY

CROSS-REFERENCE TO RELATED APPLICATION(S)

This application is a continuation of International Application No. PCT/KR2021/013607, filed on Oct. 5, 2021, which claims priority to Korean Patent Application No. 10-2020-0131998, filed on Oct. 13, 2020 in the Korean Intellectual Property Office, the disclosures of which are herein incorporated by reference.

TECHNICAL FIELD

Certain embodiments of the disclosure relate to an electronic device and a method for displaying a screen on a flexible, extendible display.

BACKGROUND

In an electronic device such as a smart-phone, large displays are preferable for providing various functions thereof, especially as computing performance increases. At the same time, there is still a demand for miniaturization of said electronic devices to improve portability.

In response to these demands, electronic devices employing flexible displays may provide large display areas without compromising portability. An electronic device employing a rollable or slidable display may facilitate a high degree of portability when a part of the display is rolled in the electronic device such that the visible display area is reduced, and may provide a large display area when the display is extended.

SUMMARY

In an electronic device including a flexible display, when the display is extended, previously displayed content may be enlarged and displayed, or content related to the content may be displayed in the extended area. Therefore, additional user input may be requested to display content different from previously displayed content, after expansion.

In addition, the content displayed on the extended display area may be identified after the screen is extended, so therefore, it may be difficult to identify the desired content simultaneously with the screen expansion.

According to certain embodiments of the disclosure, an electronic device may determine content to be displayed after expansion, based on an input received before the expansion of a display is initiated.

An electronic device according to certain embodiments of the disclosure may include housings, including a first housing and a second housing coupled to the first housing, the second housing being movable with respect to the first housing, a flexible display including an exposure area visible from an exterior environment of the electronic device via a front surface of the electronic device, the exposure area having a first size when the electronic device is disposed in a first state, and a second size larger than the first size when the electronic device is switched from the first state to a second state, at least one sensor disposed in at least one of the housings, and at least one processor electrically connected to the at least one sensor, wherein the at least one processor is configured to: based on detecting that the electronic device is disposed in the first state, display a first content in the flexible display, detect a first input via the at least one sensor, in response to the detected first input, display a user interface (UI) along with or at least partly over the first content, detect a second input to the UI, in response to detecting the second input to the UI, cancel display of the UI, and based on detecting a switch in the electronic from the first state to the second state, maintain display of the first content in a first area of the exposure area, and display a second content based on the second input in a second area of the exposure area.

An electronic device according to an embodiment may include housings including a first housing and a second housing coupled to the first housing to be movable with respect to the first housing, a flexible display having a first portion visible to the outside of the electronic device via a front surface of the electronic device, the flexible display having a second portion extending from the first portion such that the second portion is withdrawn from the interior of the first housing when the electronic device is switched from the first state to a second state and the second portion is inserted into the first housing when the electronic device is switched from the second state to the first state, at least one sensor disposed in the housings, and at least one processor electrically connected to the at least one sensor, wherein in a case where the electronic device is in the first state, the at least one processor displays a first content in the first portion, detects a first input by using the at least one sensor, in response to the detected result, displays a user interface (UI) along with or on the first content on the first portion, in response to a second input to the UI, cancels the displaying of the UI, detects the movement of the second housing by using the at least one sensor, and in a case where the electronic device is switched to the second state according to the movement of the second housing, displays the first content on at least a part of the second portion based on the second input and displays a second content on at least a part of the first portion.

An electronic device according to certain embodiments of the disclosure may include housings including a first housing and a second housing coupled to the first housing to be movable with respect to the first housing, a flexible display including an exposure area visible to the outside of the electronic device via a front surface of the electronic device, the exposure area having a first size in a case where the electronic device is in a first state and having a second size larger than the first size in a case where the electronic device is switched from the first state to a second state, at least one sensor disposed in the housings, and at least one processor electrically connected to the at least one sensor, wherein in a case where the electronic device is in the first state, the at least one processor displays a first content in the flexible display, detects a first input by using the at least one sensor, in response to the detected result, displays a user interface (UI) along with or on the first content on the flexible display, in response to a second input to the UI, moves the second housing to switch the electronic device to the second state, cancels the displaying of the UI, displays a first content in a first area of the exposure area, and displays a second content based on the second input and distinguished from the first content in a second area of the exposure area.

According to various embodiments of the disclosure, a method is disclosed in an electronic device having a first and second housing, switchable from a first state to a second state, including: based detecting, via at least one processor, that the electronic device is disposed in the first state, displaying on a flexible display a first content, wherein the flexible display includes an exposure area having a first size when the electronic device is disposed in the first state, and a second size larger than the first size when the electronic device is switched from the first state to the second state, detecting, via at least one sensor, a first input, in response to detecting the first input, display, on the flexible display, a user interface (UI) with or at least partly overlaying the first content, detecting a second input to the UI, in response to detecting the second input to the UI, cancelling display of the UI, and based on detecting a switch in the electronic device from the first state to the second state, maintaining display of the first content in a first area of the exposure area, and displaying a second content based on the second input in a second area of the exposure area.

According to certain embodiments of the disclosure, prior to extension of an expandable screen, or, during extension of the expandable screen, information associated with content to be displayed to a new display area made available by the extension may be displayed. Accordingly, display content may be confirmed during screen expansion, without requiring any additional inputs from the user after the display is fully extended.

DETAILED DESCRIPTION

Figure 1A:
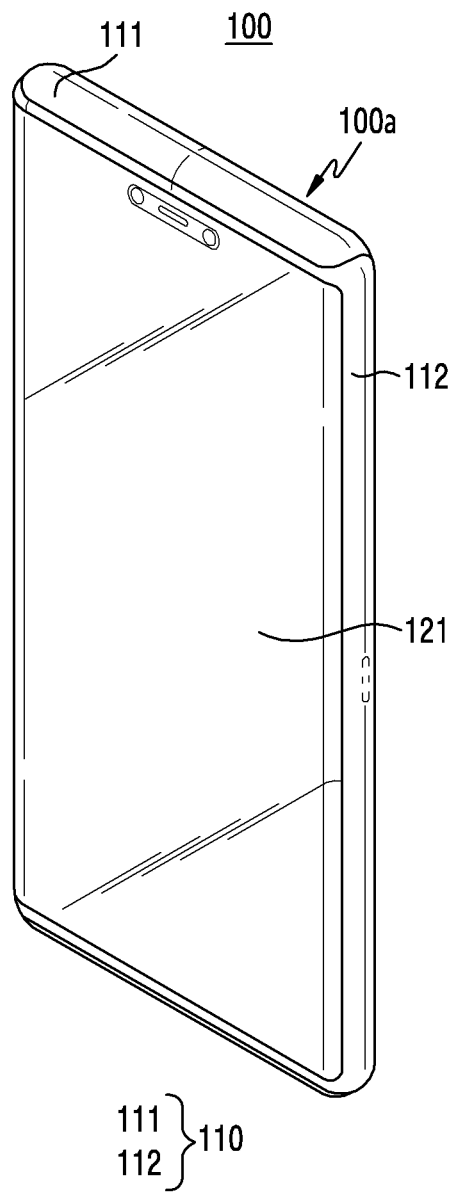
FIG. 1A is a perspective view illustrating an electronic device in a first state according to an embodiment.
Figure 1B:
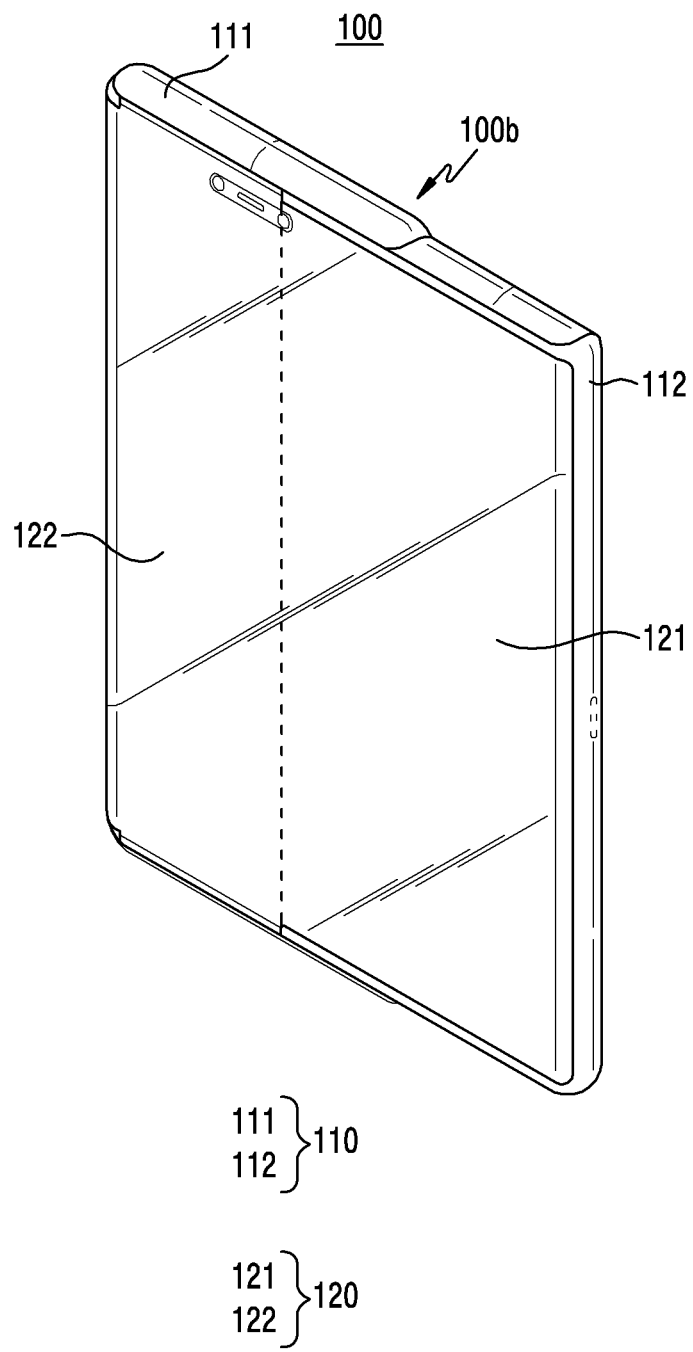
FIG. 1B is a perspective view illustrating an electronic device in a second state according to an embodiment.
Figure 1C:
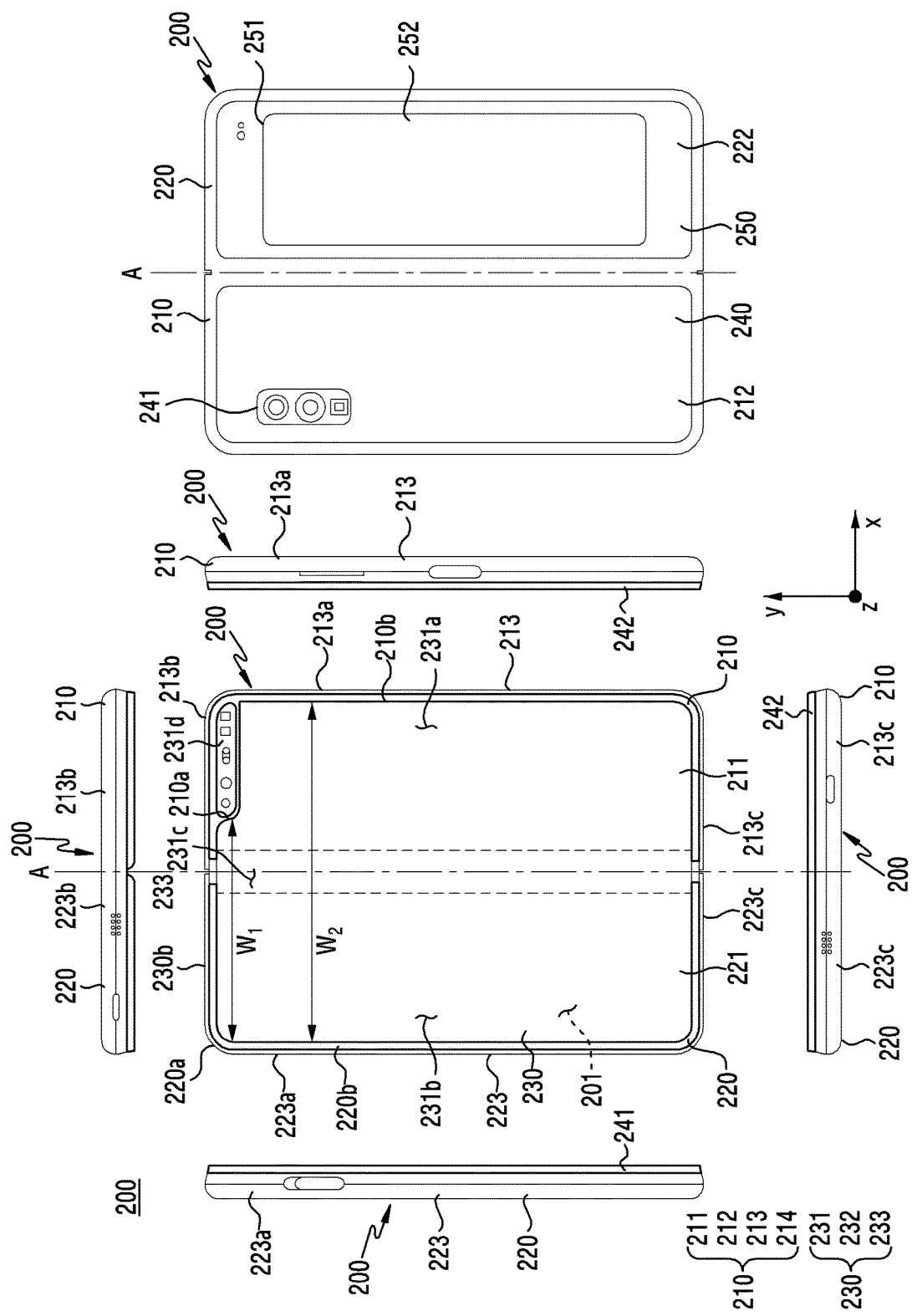
FIG. 1C is a view illustrating an unfolded state of an electronic device according to certain embodiments.
Figure 1D:
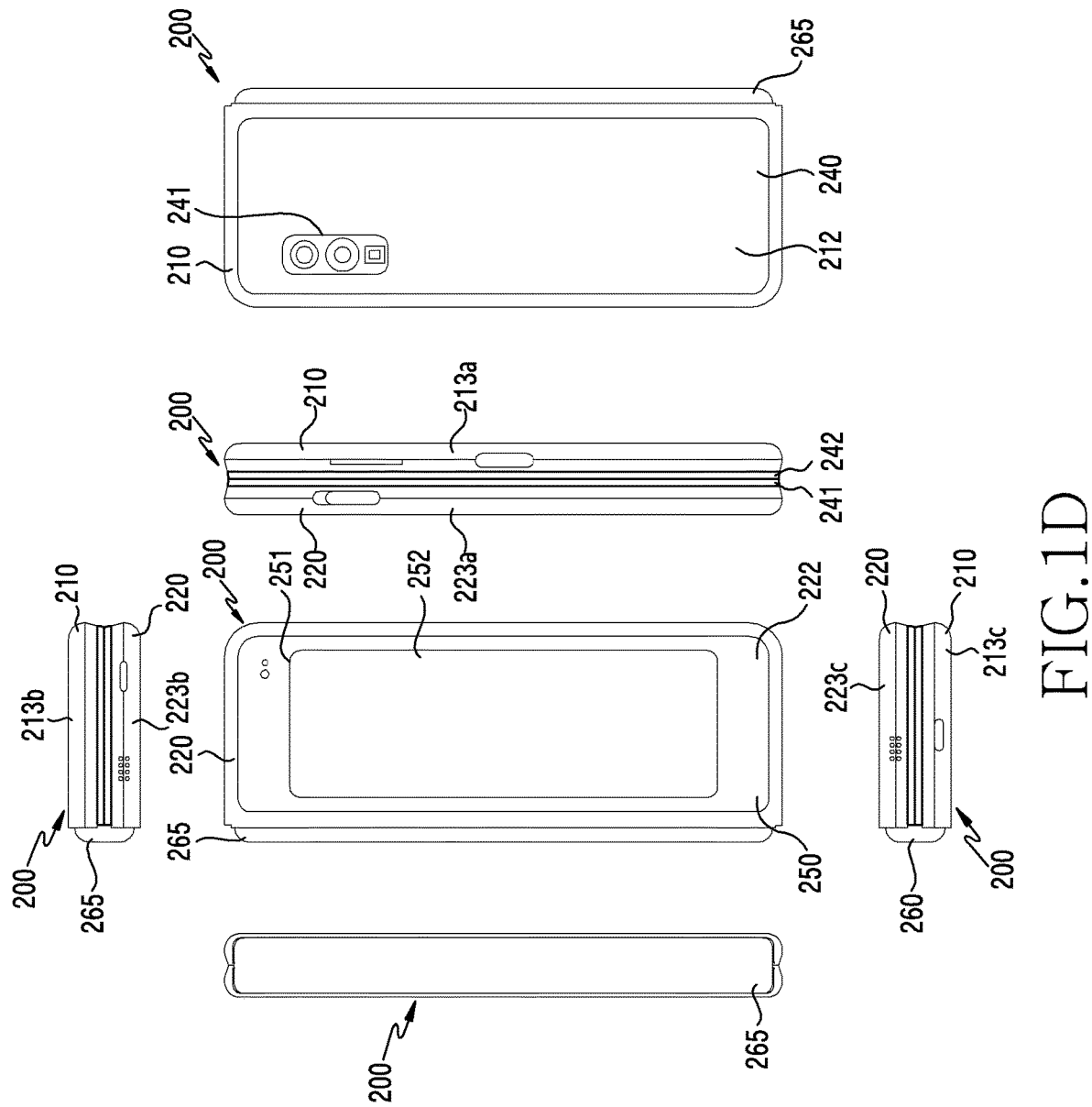
FIG. 1D is a view illustrating a folded state of the electronic device of FIG. 2A according to certain embodiments.

FIG. 1A is a front perspective view of an electronic device in a first state according to an embodiment. FIG. 1B is a front perspective view of an electronic device in a second state according to an embodiment. FIG. 1C is a view illustrating an unfolded state of an electronic device according to certain embodiments. FIG. 1D is a view illustrating a folded state of the electronic device of FIG. 1A according to certain embodiments.

Referring to FIG. 1A and FIG. 1B together, a display 120 may be positioned on one surface of an electronic device 100 according to an embodiment. Hereinafter, a surface on which the display 120 is positioned is referred to as a front surface. According to an embodiment, the display 120 may occupy most of the front surface of the electronic device 100. According to an embodiment, the display 120 may include a flat shape and a curved shape. The display 120 and housings 110 surrounding at least a part of an edge of the display 120 may be disposed on the front surface of the electronic device 100. According to an embodiment, the housings 110 may form a partial area of the front surface, a side surface, and a rear surface of the electronic device 100. According to another embodiment, the housings 110 may form a partial area of a side surface and a rear surface of the electronic device 100. According to an embodiment, the housings 110 may include a first housing 111 and a second housing 112 which is movable with respect to the first housing 111.

According to an embodiment, the display 120 may include a first portion 121 capable of being coupled to the second housing 112 and a second portion 122 extending from the first portion 121 and capable of being inserted into the electronic device 100. According to an embodiment, in a case where the electronic device 100 is switched from a first state 100*a* to a second state 100*b* according to the movement of the second housing 112, the second portion 122 of the display 120 may be withdrawn from the inside of the electronic device 100 to the exterior environment. According to an embodiment, in a case where the electronic device 100 is switched from the second state 100*b* to the first state 100*a* according to the movement of the second housing 112, the second portion 122 of the display 120 may be inserted into the electronic device 100.

An electronic device 200 of FIG. 1C and FIG. 1D may be at least partially similar to the electronic device 100 of FIG. 1A and FIG. 1B or may include other embodiments.

Referring to FIG. 1C, the electronic device 200 may include a pair of housing structures 210 and 220 rotatably coupled to each other to be folded with respect to each other via a hinge structure, a hinge cover 265 for covering foldable parts of the pair of housing structures 210 and 220, and a display 230 (e.g., a flexible display or a foldable display) placed in a space formed by the pair of housing structures 210 and 220. In the disclosure, a surface on which the display 230 is disposed may be defined as a front surface of the electronic device 200, and a surface opposite to the front surface may be defined as a rear surface of the electronic device 200. In addition, a surface surrounding a space between the front surface and the rear surface may be defined as a side surface of the electronic device 200.

In an embodiment, the pair of housing structures 210 and 220 may include a first housing structure 210 including a sensor area 231d, a second housing structure 220, a first rear cover 240, and a second rear cover 250. The pair of housing structures 210 and 220 of the electronic device 200 are not limited to the shapes and combinations shown in FIG. 1C and FIG. 1D, and may be implemented by combinations and/or couplings of other shapes or parts. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be arranged on opposite sides of a folding axis (A axis) and have a symmetrical shape with respect to the folding axis (A axis) as a whole. According to an embodiment, the first housing structure 210 and the second housing structure 220 may have angles or distances different from each other depending on whether the state of the electronic device 200 is an unfolded state (a flat stage or a closing state), a folded state (a folding state), or an intermediate state. According to an embodiment, unlike the second housing structure 220, the first housing structure 210 may additionally include the sensor area 231d in which various sensors are arranged, but other areas may have a mutually symmetrical shape. In another embodiment, the sensor arrangement area 231d may be additionally disposed or replaced in at least a partial area of the second housing structure 220. In an embodiment, the first housing structure 210 may include, in an unfolded state of the electronic device 200, a first surface 211 connected to a hinge structure (e.g., the hinge structure 264 of FIG. 3) and disposed to face the front surface of the electronic device 200, a second surface 212 facing the direction opposite to the first surface 211, and a first side surface member 213 surrounding at least a part of the space between the first surface 211 and the second surface 212. In an embodiment, the first side surface member 213 may include a first side surface 213a disposed parallel to the folding axis (A axis), a second side surface 213b extending from one end of the first side surface 213a in a direction perpendicular to the folding axis, and a third side surface 213c extending from the other end of the first side surface 213a in a direction perpendicular to the folding axis (A axis).

In an embodiment, the second housing structure 220 may include, in an unfolded state of the electronic device 200, a third surface 221 connected to the hinge structure and disposed to face the front surface of the electronic device 200, a fourth surface 222 facing the direction opposite to the third surface 221, and a second side surface member 223 for surrounding at least a part of the space between the third surface 221 and the fourth surface 222. In an embodiment, the second side surface member 223 may include a fourth side surface 223a disposed parallel to the folding axis (A axis), a fifth side surface 223b extending from one end of the fourth side surface 223a in a direction perpendicular to the folding axis (A axis), and a sixth side surface 223c extending from the other end of the fourth side surface 223a in a direction perpendicular to the folding axis (A axis). In an embodiment, the third surface 221 may be disposed to face the first surface 211 in a folded state. In an embodiment, the electronic device 200 may include a recess 201 formed to accommodate the display 230 via a structural shape combination of the first housing structure 210 and the second housing structure 220. The size of the recess 201 may be substantially the same as that of the display 230. In an embodiment, due to the sensor area 231d, the recess 201 may have two or more widths different from each other in a direction perpendicular to the folding axis (A axis). For example, the recess 201 may have a first width (W1) between a first portion 220a parallel to the folding axis (A axis) in the second housing structure 220 and a first portion 210a formed on an edge of the sensor area 231d in the first housing structure 210, and a second width (W2) formed by a second portion 220b of the second housing structure 220 and a second portion 210b which does not belong to the sensor area 231d and is parallel to the folding axis (A axis). The second width (W2) may be formed to be longer than the first width (W1). For example, the recess 201 may be formed to have the first width (W1) formed from the first portion 210a of the first housing structure 210 to the first portion 220a of the second housing structure 220 having a mutually asymmetrical shape, and the second width (W2) formed from the second portion 210b of the first housing to 15 the second portion 220b of the second housing structure 220 having a mutually symmetrical shape. In an embodiment, the first portion 210a and the second portion 210b of the first housing structure 210 may be formed to have mutually different distances from the folding axis (A axis). The widths of the recess 201 are not limited to the shown examples. In certain embodiments, the recess 201 may have two or more width different from each other by the shape of the sensor area 231d or a portion having an asymmetrical shape in the first housing structure 210 and the second housing structure 220.

In an embodiment, at least a part of the first housing structure 210 and the second housing structure 220 may be formed of a metal or non-metal material having a selected magnitude of hardness so as to support the display 230.

In an embodiment, the sensor area 231d may be formed to be adjacent to one side corner of the first housing structure 210 and have a predetermined area. The arrangement, shape, or size of the sensor area 231d is not limited to the shown example. For example, in another embodiment, the sensor area 231d may be provided in another corner or any area between an upper end corner and a lower end corner of the first housing structure 210. As another embodiment, the sensor area 231d may be disposed in at least a partial area of the second housing structure. As another embodiment, the sensor area 231d may be disposed to extend to the first housing structure 210 and the second housing structure 220. In an embodiment, the electronic device 200 may comprise for performing various functions, the components being arranged to be exposed on the front surface of the electronic device 200 through the sensor area 231d or one or more openings provided through the sensor area 231*d*. In certain embodiments, the components may include, for example, at least one among a front camera device, a receiver, a proximity sensor, an illuminance sensor, an iris recognition sensor, an ultrasonic sensor, or an indicator.

In an embodiment, the first rear cover 240 may be disposed on the second surface 212 of the first housing structure 210, and may have a substantially rectangular periphery. In an embodiment, at least a part of the periphery may be surrounded by the first housing structure 210. Similarly, the second rear cover 250 may be disposed on the fourth surface 222 of the second housing structure 220, and at least a part of the periphery thereof may be surrounded by the second housing structure 220.

In the illustrated embodiments, the first rear cover 240 and the second rear cover 250 may have a substantially symmetrical shape based on the folding axis (A axis). As another embodiment, the first rear cover 240 and the second rear cover 250 may include various shapes different from each other. As another embodiment, the first rear cover 240 may be integrally formed with the first housing structure 210, and the second rear cover 250 may be integrally formed with the second housing structure 220. In an embodiment, the first rear cover 240, the second rear cover 250, the first housing structure 210, and the second housing structure 220 may provide a space in which various components (e.g., a printed circuit board, an antenna module, a sensor module, or a battery) of the electronic device 200 are capable of being arranged via a mutually coupled structure. In an embodiment, in the rear surface of the electronic device 200, one or more components may be arranged or visually exposed. For example, one or more components or sensors may be visually exposed through a first rear surface area 241 of the first rear cover 240. In certain embodiments, the sensor may include a proximity sensor, a rear camera device, and/or a flash. In another embodiment, at least a part of a sub display 252 may be visually exposed through a second rear area 251 of the second rear cover 250. According to another embodiment, the sub display 252 may be integrally formed with the display 230.

According to an embodiment, based on input to the content displayed on the sub display 252, the content displayed via the display 230 in an unfolded state may be determined.

The display 230 may be disposed in the space formed by the foldable housings 210 and 220. For example, the display 230 may be stably seated in the recess (e.g., the recess 201 of FIG. 2A) formed by the pair of housing structures 210 and 220, and may be disposed to substantially occupy most of the front surface of the electronic device 200. Therefore, the front surface of the electronic device 200 may include the display 230, a partial area (e.g., a peripheral area) of the first housing structure 210 adjacent to the display 230, and a partial area (e.g., a peripheral area) of the second housing structure 220. In an embodiment, the rear surface of the electronic device 200 may include the first rear cover 240, a partial area (e.g., a peripheral area) of the first housing structure 210 adjacent to the first rear cover 240, the second rear cover 250, and a partial area (e.g., a peripheral area) of the second housing structure 220 adjacent to the second rear cover 250.

In an embodiment, the display 230 may imply a display of which at least a partial area is transformable to a flat surface or a curved surface. In an embodiment, the display 230 may include a folding area 231*c*, a first area 231*a* disposed in one side (e.g., a right area of the folding area 231*c*) and a second area 231*b* disposed in the other area (e.g., a left area of the folding area 231*c*) with reference to the folding area 231*c*. For example, the first area 231*a* may be disposed on the first surface 211 of the first housing structure 210, and the second area 231*b* may be disposed on the third surface 221 of the second housing structure 220. In an embodiment, the division of areas of the display 230 is an example, and the display 230 may be divided into a plurality of areas (e.g., four or more areas or two areas) according to the structure or function. As an example, in the embodiment shown in FIG. 1C, the area of the display 230 may be divided by the folding area 231*c* or the folding axis (A axis) extending parallel to the y-axis, but in another embodiment, the display 230 may be divided into areas based on another folding area (e.g., a folding area parallel to the x-axis) or another folding axis (e.g., a folding axis parallel to the x-axis). The above-described area division of the display is a physical division by the pair of housing structures 210 and 220 and the hinge structure, and practically, the display 230 may display one entire screen via the pair of housing structures 210 and 220 and the hinge structure. In an embodiment, the first area 231*a* and the second area 231*b* may have a symmetrical shape around the folding area 231*c* as a whole. Unlike the second area 231*b*, the first area 231*a* may include a cut notch area according to the existence of the sensor area 231*d*, but other areas may have a symmetrical shape with the second area 231*b*. For example, the first area 231*a* and the second area 231*b* may include a portion having a mutually symmetrical shape and a portion having a mutually asymmetrical shape.

Referring to FIG. 1D, the hinge cover 265 may be disposed between the first housing structure 210 and the second housing structure 220 to be capable of covering internal components. In an embodiment, the hinge cover 265 may be covered by a part of the first housing structure 210 and the second housing structure 220 or be exposed to the exterior environment according to the operation state (an unfolded state (a flat state) or a folded state) of the electronic device 200. For example, as shown in FIG. 1C, in a case where the electronic device 200 is in an unfolded state, the hinge cover 265 may be prevented from being exposed by being covered by the first housing structure 210 and the second housing structure 220. For example, as shown in FIG. 1D, in a case where the electronic device 200 is a folded state (e.g., a completely folded state), the hinge cover 265 may be exposed to the exterior environment between the first housing structure 210 and the second housing structure 220. For example, in a case of an intermediate state in which the first housing structure 210 and the second housing structure 220 make a predetermined angle with respect to each other, the hinge cover 265 may be exposed to the exterior environment of the electronic device 200 between the first housing structure 210 and the second housing structure 220. The exposed area may be smaller than that in a completely folded state. In an embodiment, the hinge cover 265 may include a curved surface.

Hereinafter, each area of the display 230 and the operation of the first housing structure 210 and the second housing structure 220 according to the operating state of the electronic device 200 (e.g., an unfolded state (flat state) and a folded state (folded state)) will be described.

In an embodiment, in a case where the electronic device 200 is in an unfolded state (a flat state) (e.g., the state of FIG. 2A), the first housing structure 210 and the second housing structure 220 form an angle of 180 degrees, and the first area 231*a* and the second area 231*b* of the display may be arranged to face the same direction. In addition, the folding area 231c may form the same plane as the first area 231a and the second area 231b.

In an embodiment, in a case where the electronic device 200 is in a folded state (e.g., the state of FIG. 2B), the first housing structure 210 and the second housing structure 220 may be arranged to face each other. The first area 231a and the second area 231b of the display 230 may form a small angle (e.g., from 0 degrees to 10 degrees) with each other, and may face each other. At least a part of the folding area 231c may form a curved surface having a predetermined curvature.

In an embodiment, in a case where the electronic device 200 is in the intermediate state, the first housing structure 210 and the second housing structure 220 may be arranged to make a predetermined angle with respect to each other. The first area 231a and the second area 231b of the display 230 may form an angle greater than that in a folded state and smaller than that in an unfolded state. At least a part of the folding area 231c may form a curved surface having a predetermined curvature, and the curvature may be smaller than that in a folded state.

Figure 2:
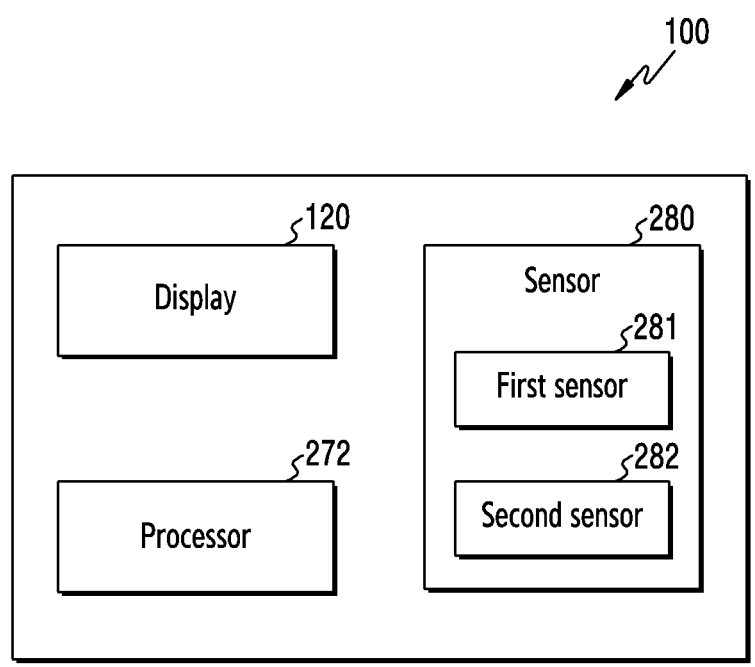
FIG. 2 is a block diagram illustrating elements of an electronic device according to an embodiment.

FIG. 2 is a block diagram illustrating elements of an electronic device according to an embodiment.

Referring to FIG. 2, an electronic device 100 according to an embodiment may include at least one processor 272, at least one sensor 280, and the display 120. The same reference numerals have been used for the elements the same or substantially the same as the elements having the same content described above, and overlapping descriptions may be omitted.

Referring to FIG. 1A, FIG. 1B, and FIG. 2, according to an embodiment, the electronic device 100 may include at least one sensor 280 therein. According to an embodiment, the at least one sensor 280 may be disposed in the housings 110. According to an embodiment, the at least one sensor 280 may include a first sensor 281 and a second sensor 282 distinct from the first sensor 281. According to another embodiment, a part (e.g., the second sensor 282) of the above-described elements may be omitted or added.

According to an embodiment, the first sensor 281 may include a grip sensor. According to an embodiment, the first sensor 281 may detect whether or not the human body is adjacent to the second housing 112. The first sensor 281 according to an embodiment may detect a pattern of input with respect to the second housing 112. For example, a pattern of input may include a swiping or drag operation of a predetermined path. According to an embodiment, the first sensor 281 may detect a pressure value of input with respect to the housings 110. According to an embodiment, the first sensor 281 may detect the maintenance time of input to the second housing 112.

According to an embodiment, the electronic device 100 may include at least one sensor 280 for measuring the degree of movement and/or the degree of change of the housings 110. According to an embodiment, the second sensor 282 may measure the distance of the second housing 112 with respect to the first housing 111. For example, the second sensor 282 may include at least one among a time of flight (TOF) sensor, an ultrasonic sensor, or a radio wave sensor. According to another embodiment, the second sensor 282 may include a sensor for detecting the state of the display 120. For example, the display 120 may be configured to produce distinct electrical signals in the first state 100a and the second state 100b, respectively. According to an embodiment, the second sensor may include a Hall sensor or a magnetic sensor, but is not limited thereto.

According to an embodiment, the electronic device 100 may include at least one processor 272 therein. According to an embodiment, the at least one processor 272 may be electrically connected to the at least one sensor 280 and the display 120. For example, the at least one processor 272 may determine whether the detected input pattern by using the first sensor 281 corresponds to the stored input. For another example, the at least one processor 272 may determine whether the pressure value or time of the input detected using the first sensor 281 is equal to or greater than a stored reference value.

According to an embodiment, the at least one processor 272 may determine the state of the electronic device 100 by using the second sensor 282. For example, the at least one processor 272 may determine whether the electronic device 100 is in the first state 100a or the second state 100b by measuring the distance of the second housing 112 with respect to the first housing 111 using the second sensor 282.

Figure 3:
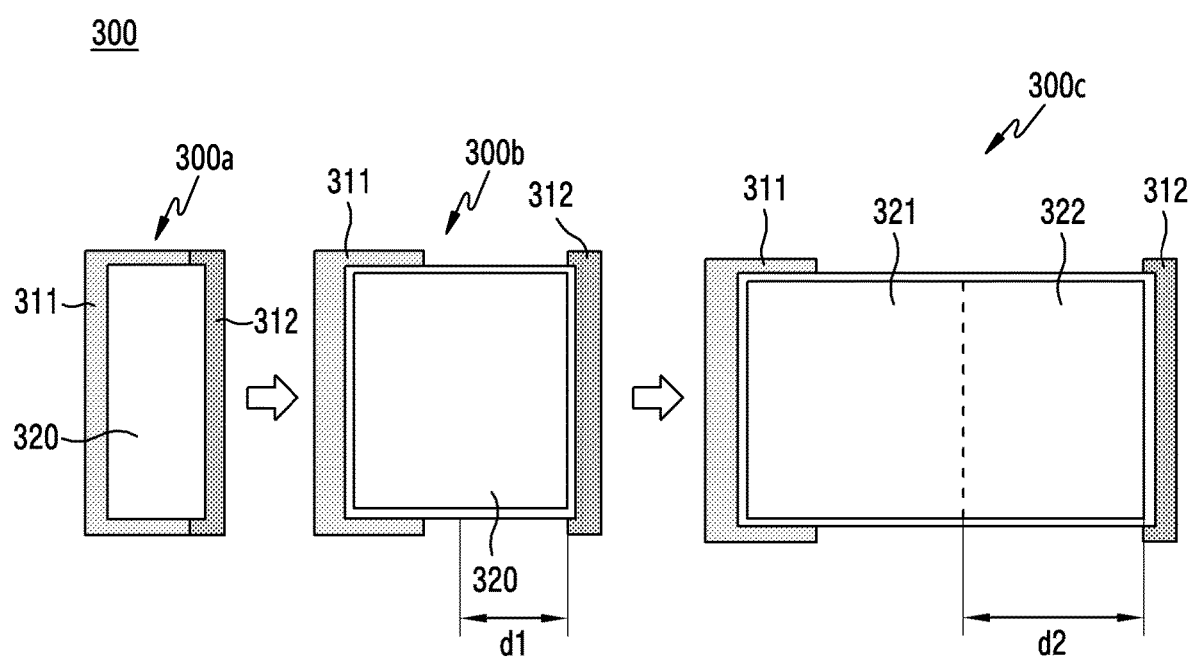
FIG. 3 illustrates changes of a display depending on the state change of an electronic device according to an embodiment.

FIG. 3 illustrates changes in display area, depending on the state change of an electronic device according to an embodiment.

Referring to FIG. 3, an electronic device 300 according to an embodiment may include a first housing 311, a second housing 312, and a display 320. The same or similar reference numerals have been used for the elements the same or substantially the same as the elements having the same content described above, and overlapping descriptions may be omitted.

According to an embodiment, at least a part of the display 320 of the electronic device 300 may be exposed to the exterior environment of the electronic device 300. According to an embodiment, the display 320 of the electronic device 300 may be exposed to the exterior environment of the electronic device 300 by a first size in a first state 300a.

According to an embodiment, the second housing 312 may move by the first distance (d1) with respect to the first housing 311, and by this movement, the electronic device 300 may be converted from the first state 300a to the intermediate state 300b. According to an embodiment, the second housing 312 may move by the second distance (d2) with respect to the first housing 311, and the electronic device 300 may thus be converted from the intermediate state 300b to a second state 300c. According to an embodiment, the transition of the electronic device 300 from the first state 300a via the intermediate state 300b to the second state 300c may be continuous.

According to an embodiment, a new portion of the display 320 may be exposed to an exterior environment of the electronic device 300 in the second state 300c. According to an embodiment, when the electronic device 300 is disposed in the second state 300c, the display 320 may be extended so as to include a first area 321 and a second area 322. The second area 322 is distinct from and excludes the first area 321, out of the areas exposed to exterior environment of the electronic device 300. According to an embodiment, the at least one processor may display a first content on the first area 321, and display a second content on the second area 322, but the explanation thereof will be given later below.

Figure 4:
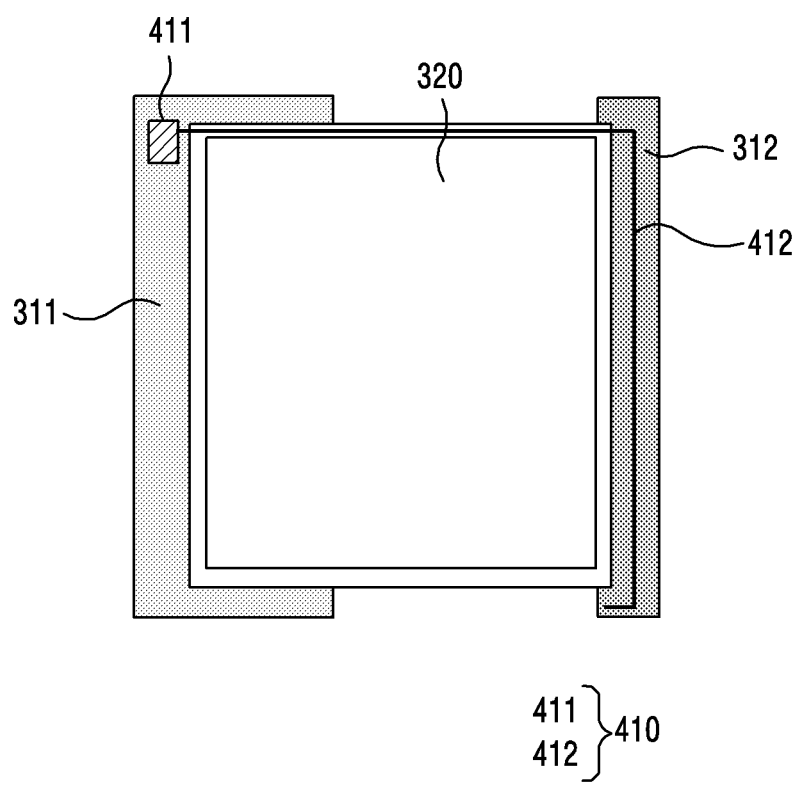
FIG. 4 illustrates a sensor for detecting a grip of a user according to an embodiment.

FIG. 4 illustrates a sensor for detecting a grip of a user according to an embodiment.

Referring to FIG. 3 and FIG. 4 together, an electronic device 300 according to an embodiment may include a first housing 311, a second housing 312 movable with respect to the first housing 311, a display 320, or a sensor 410 (e.g., the sensor 280 in FIG. 2). The same reference numerals have been used for the elements the same or substantially the same as the elements having the same content described above, and overlapping descriptions may be omitted.

According to an embodiment, the sensor 410 (e.g., a grip sensor) may include a sensor integrated circuit (IC) 411 and a sensing pattern 412. According to an embodiment, the sensor IC 411 may be disposed in the first housing 311. According to another embodiment, the sensor IC 411 may be disposed within a space (e.g., a hollow) of the first housing 311 and/or the second housing 312, but the positioning is not limited thereto.

According to an embodiment, the sensing pattern 412 may be electrically connected to the sensor IC 411. According to an embodiment, one end of the sensing pattern 412 may be connected to the sensor IC 411, and the other end thereof may be connected to the second housing 312. According to an embodiment, at least a part of the sensing pattern 412 may be disposed in the second housing 312. According to another embodiment, at least a part of the sensing pattern 412 may be disposed on the second housing 312. According to an embodiment, when the second housing 312 includes a conductive member, a separate sensing pattern 412 may be omitted, and the conductive member may itself operate as the sensing pattern 412.

Referring to FIG. 2 and FIG. 4 together, the at least one processor 272 according to an embodiment may be electrically connected to the sensor IC 411. According to an embodiment, the at least one processor 272 may detect an input of a user with respect to the second housing 312 or the first housing 311 using the sensor 410. For example, the at least one processor 272 may detect a pattern included within the input with respect to the second housing 312 using the sensing pattern 412. According to an embodiment, the at least one processor 272 may compare the detected pattern with a stored pattern to confirm the input.

Figure 5:
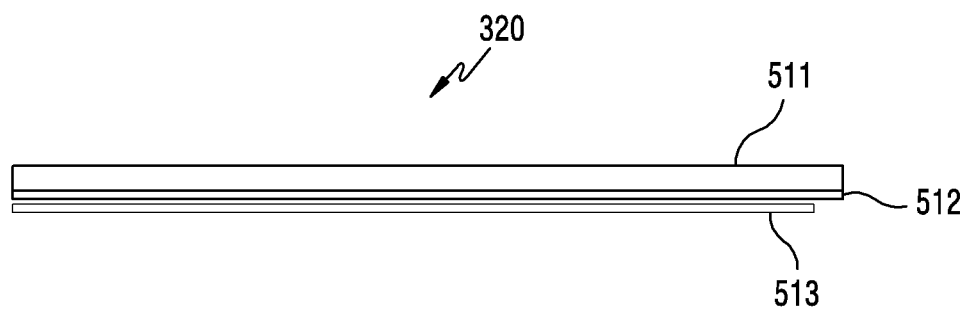
FIG. 5 is a cross-sectional view showing a display structure for detecting a grip of a user according to an embodiment.

FIG. 5 is a cross-sectional view showing a display structure for detecting a grip of a user according to an embodiment.

Referring to FIG. 5, a display 320 according to an embodiment may include a plurality of layers. According to an embodiment, the display 320 may include a transparent panel 511 exposed to the exterior environment of the electronic device 300. For example, the transparent panel 511 may include at least one among ultra-thin glass (UTG) or polyamide (PI) film, but is not limited thereto.

According to an embodiment, the display 320 may include a first layer 512 adjacent to the transparent panel 511. According to an embodiment, the first layer 512 may include a plurality of electrodes in at least one area. According to an embodiment, the first layer 512 may be implemented as a panel on which electrodes for receiving touch input, fingerprint recognition, or pen input are arranged.

According to an embodiment, the display 320 may include a display panel 513. The display panel 513 according to an embodiment may include an organic light emitting diodes (OLED) panel, a liquid crystal display (LCD) panel, or a quantum dot light-emitting diodes (QLED) panel. The display panel 513 may include a plurality of pixels for displaying an image, and one pixel may include a plurality of sub pixels. In an embodiment, one pixel may include a red sub pixel, a green sub pixel, and a blue sub pixel. In another embodiment, one pixel may include a red sub pixel, a first green sub pixel, a blue sub pixel, and a second green sub pixel.

According to an embodiment, at least one area of the first layer 512 may be disposed to prevent overlap with the display panel 513 and/or the transparent panel 511. For example, the first layer 512 may include an area which does not overlap the display panel 513, by having a larger width than the display panel 513.

Referring to FIG. 2 and FIG. 5 together, the at least one processor 272 according to an embodiment may detect an input with respect to the area of the first area 512 which does not overlap the display panel 513. According to an embodiment, the at least one processor 272 may detect an input to an area of the first layer 512 which does not overlap the display panel 513, and compare the detected input with a stored input pattern. For example, in a case where the detected input corresponds to the stored input pattern (e.g., thereby authenticating the detected input), the at least one processor 272 may display a user interface (UI) on the display 320. The description thereof will be given later.

Figure 6:
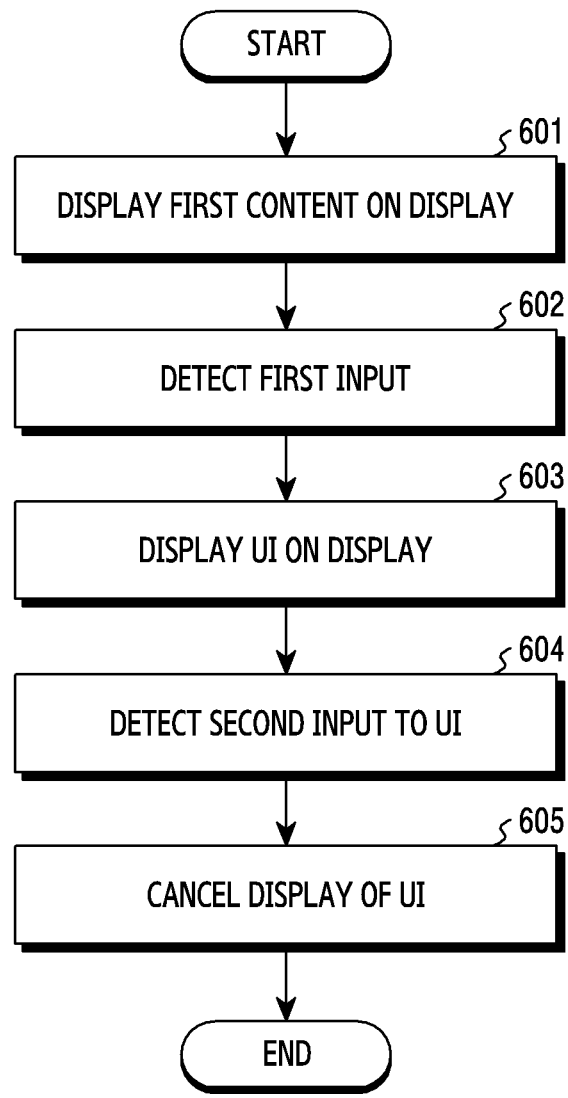
FIG. 6 is a flowchart showing an operation of displaying a UI according to an input and cancelling the displaying of the UI according to an embodiment.

FIG. 6 is a flowchart showing an operation of displaying a UI according to an input and cancelling the displaying of the UI according to an embodiment.

Referring to FIG. 3 and FIG. 6 together, the electronic device 300 according to an embodiment may display the first content and UI on the display 320 or cancel the displaying of the UI on the display 320 according to a user's input.

According to an embodiment, in operation 601, the electronic device 300 may display the first content on the display 320. According to an embodiment, in operation 601, the electronic device 300 may display the first content on at least one area (e.g., the first area 321 of the display 320 of FIG. 3) of the display 320. For example, the first content may include an application execution screen. In another example, the first content may include a standby screen or a home screen.

According to an embodiment, in operation 602, the electronic device 300 may detect a first input using the at least one sensor 280 (e.g., the sensor 410 of FIG. 4). According to an embodiment, the electronic device 300, or the at least one processor 272 of the electronic device 300, may detect the first input using the first sensor 281 in operation 602. According to an embodiment, the at least one processor 272 may detect the first input with respect to the second housing 312 using the at least one sensor 280. For example, the at least one processor 272 may detect a user's grip on the second housing 312 using the first sensor 281. According to another embodiment, the at least one processor 272 may detect the first input with respect to one area of the display 320. For example, the processor 272 may detect the user's grip with respect to the second housing 312 using a touch sensor included in the display 320.

According to an embodiment, in operation 603, the at least one processor 272 may display a user interface (UI) on the display 320, in response to detecting the first input detected in operation 602. According to an embodiment, in response to detecting the first input, the at least one processor 272 may display a UI on one area of the display 320. For example, the at least one processor 272 may display a UI on one area of the display 320 adjacent to the second housing 312. For example, a UI may include at least one of an application icon or a preview of an application execution screen, but the disclosure is not limited thereto.

Referring to FIG. 5 and FIG. 6 together, in operation 604, the at least one processor 272 may detect a second input to a UI. According to an embodiment, the at least one processor 272 may detect the second input to a UI, via the first layer 512 of the display 320. For example, the second input may include at least one of a touch with respect to an icon, or a drag input, but is not limited thereto.

According to an embodiment, in operation 605, the at least one processor 272 may cancel display of the UI displayed on the display 320 in operation 603, in response to detecting the second input. According to an embodiment, in response to detecting the second input, the at least one processor 272 may remove the UI displayed on the display 320, and display at least a part of the first content on one area where the display of the UI has been removed. For example, the at least one processor 272 may move the UI on the display 320 in one direction so as to cancel the displaying of the UI. For another example, in response to the second input, the at least one processor 272 may control the transparency of the UI to remove the displayed UI, but the operation of cancelling display of the UI is not limited thereto. For another example, the at least one processor 272 may change the shape of the UI, so as to provide a guide for a user. According to another embodiment, at least one of the above-described operations (e.g., operation 605) may be omitted, or another operation may be added. According to an embodiment, in response to the second input, the at least one processor 272 may change the UI to an additional icon. According to an embodiment, the additional icon may provide a guide with respect to the content displayed on the display 320, in a case where the state of the electronic device 300 is switched.

Figure 7A:
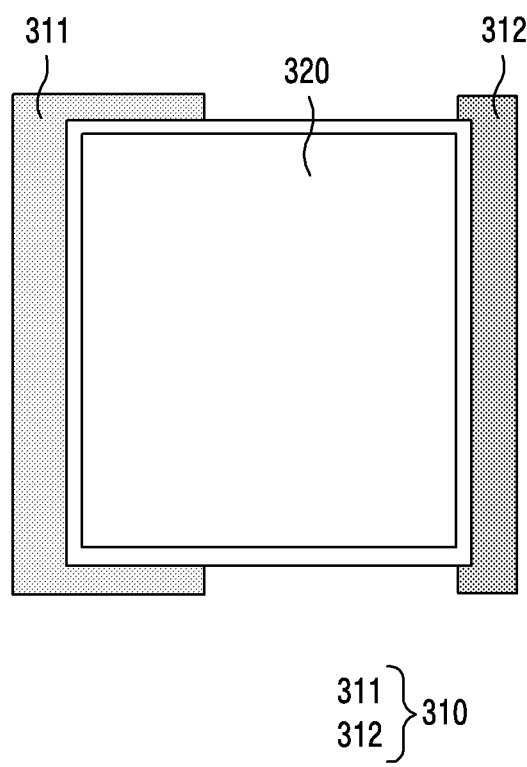
FIG. 7A illustrates a display and an electronic device before detecting a first input according to an embodiment.
Figure 7B:
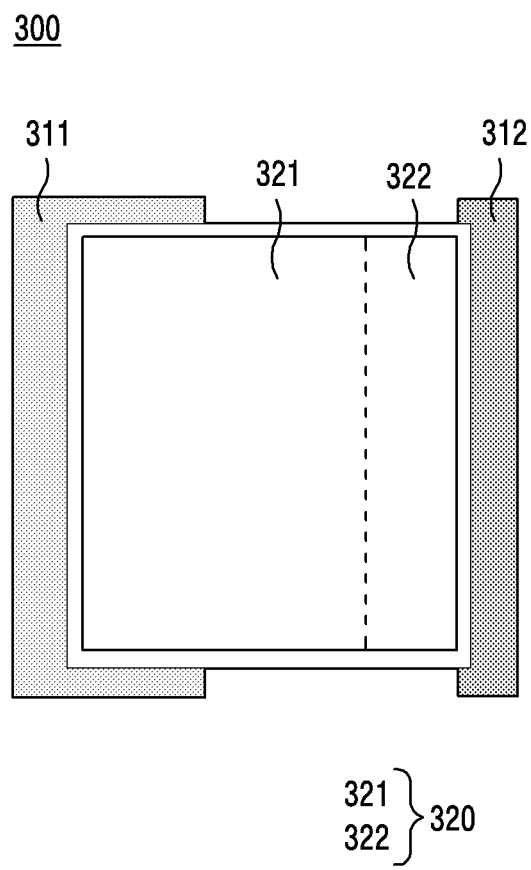
FIG. 7B illustrates a display area configured depending on a first input according to an embodiment.

FIG. 7A illustrates a display and an electronic device before detecting a first input according to an embodiment. FIG. 7B illustrates a display area configured depending on a first input according to an embodiment.

Referring to FIG. 7A and FIG. 7B, an electronic device 300 according to an embodiment may include a first housing 311, a second housing 312 movable with respect to the first housing 311, and a display 320. The same reference numerals have been used for the elements the same or substantially the same as the elements having the same content described above, and overlapping descriptions may be omitted.

Referring to FIG. 2, FIG. 7A, and FIG. 7B together, the electronic device 300 or at least one processor 272 of the electronic device 300 may detect a first input of a user using at least one sensor 280. For example, the at least one processor 272 may detect a grip of a user with respect to the second housing 312, using the first sensor 281. The at least one processor 272 may compare the grip of the user as detected using the first sensor 281, with a stored input pattern. For another example, the first sensor 281 may be implemented using a physical button, and detect a first input according to the input of a user with respect to the button. For example, the first sensor 281 may include a grip sensor or a touch sensor.

According to an embodiment, the display 320 may include a first area 321 on which a first content is displayed, and a second area 322 of the display 320 that excludes the first area 321. According to an embodiment, the at least one processor 272 may display a UI in the second area 322 based on a comparison result between the first input that was detected using the at least one sensor 280, and the stored input pattern. For example, in a case where the first input corresponds to the stored input pattern, the at least one processor 272 may display the first content in the first area 321 and display the UI in the second area 322. The description thereof will be given later.

Figure 8A:
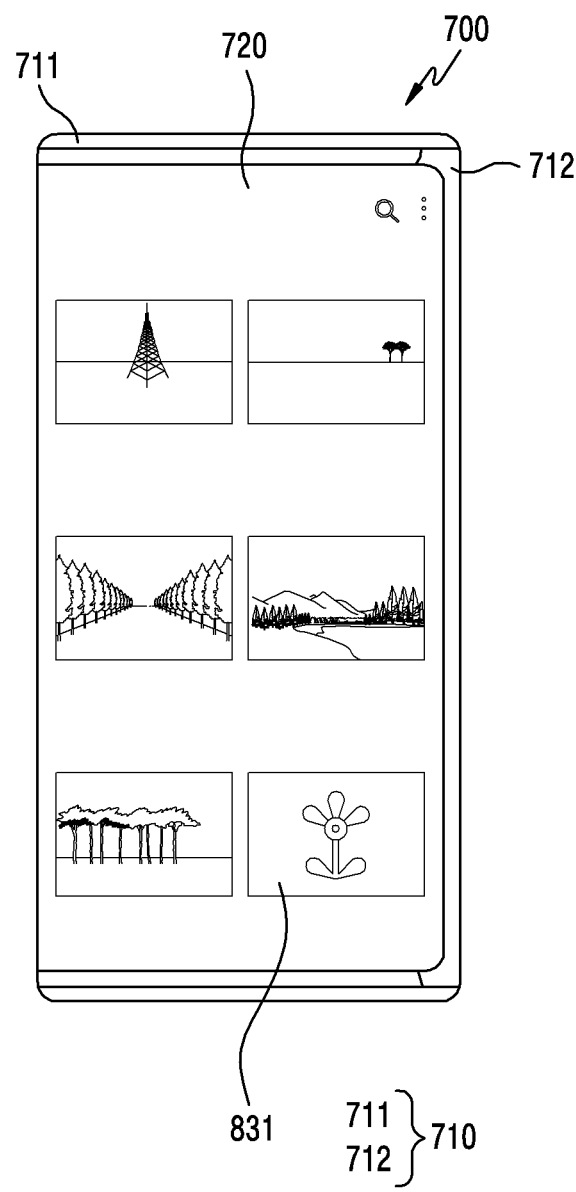
FIG. 8A illustrates an electronic device for displaying a first content on a display according to an embodiment.
Figure 8B:
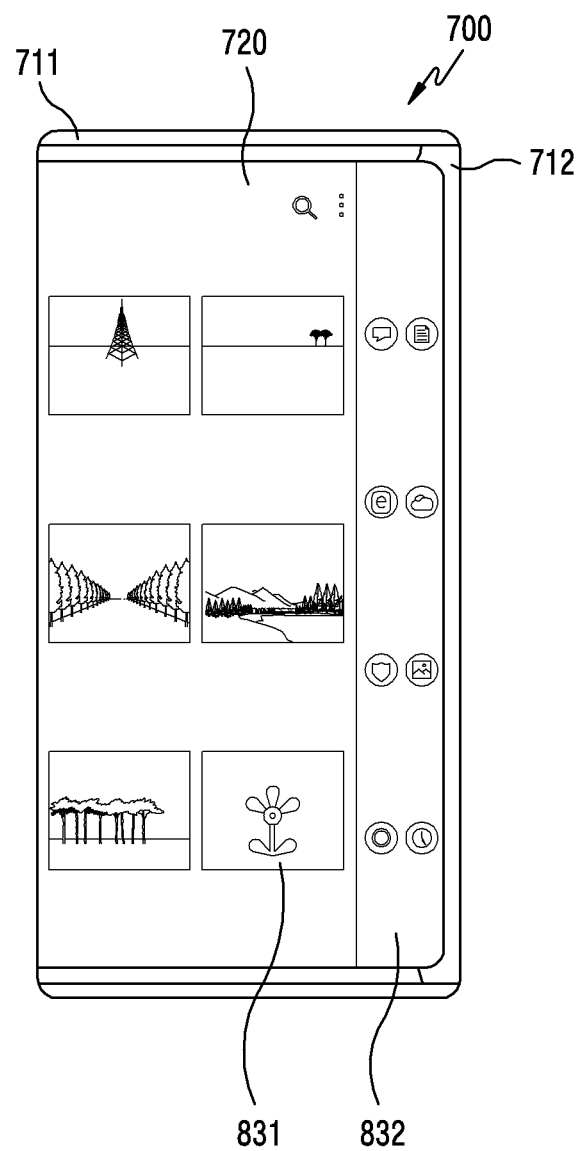
FIG. 8B illustrates an electronic device for displaying a first content and a UI on a display according to an embodiment.

FIG. 8A illustrates an electronic device for displaying a first content on a display according to an embodiment. FIG. 8B illustrates an electronic device for displaying a first content and a UI on a display according to an embodiment.

Referring to FIG. 7A, FIG. 7B, FIG. 8A, and FIG. 8B together, an electronic device 700 may display a first content 831 and/or a UI 832 on a display 720. The same reference numerals have been used for the elements the same or substantially the same as the elements having the same content described above, and overlapping descriptions may be omitted.

Referring to FIG. 8A, the electronic device 700 according to an embodiment may display a first content 831 on the display 720. According to an embodiment, the first content 831 may include at least one among an application or a graphic user interface (GUI), but is not limited thereto.

According to an embodiment, the electronic device 700 may detect a first input. According to an embodiment, the electronic device 700 may detect the first input while displaying the first content 831 on the display 720. According to an embodiment, the first input may be distinct from inputs to the first content 831. For example, a first input may include at least one of a grip with respect to the second housing 712 or a touch with respect to one area of the display 720, but is not limited thereto.

Referring to FIG. 8B, the electronic device 700 according to an embodiment may display a first content 831 and a UI 832 on the display 720 in response to a first input. According to an embodiment, the UI 832 may include at least one of a menu (e.g., a slide out menu having multiple apps indicated therein), an executable application icon, summary information, or a preview, but is not limited thereto.

According to an embodiment, in response to a first input, the UI 832 displayed on the display 720 may be displayed together with the first content 831 or on the first content 831. According to an embodiment, the electronic device 700 may reduce a display size of the first content 831 in response to the first input, and display the UI 832 on the area from where the first content 831 is removed by the resizing, or display the UI 832 on or over the first content 831. The description thereof will be given later.

Figure 9A:
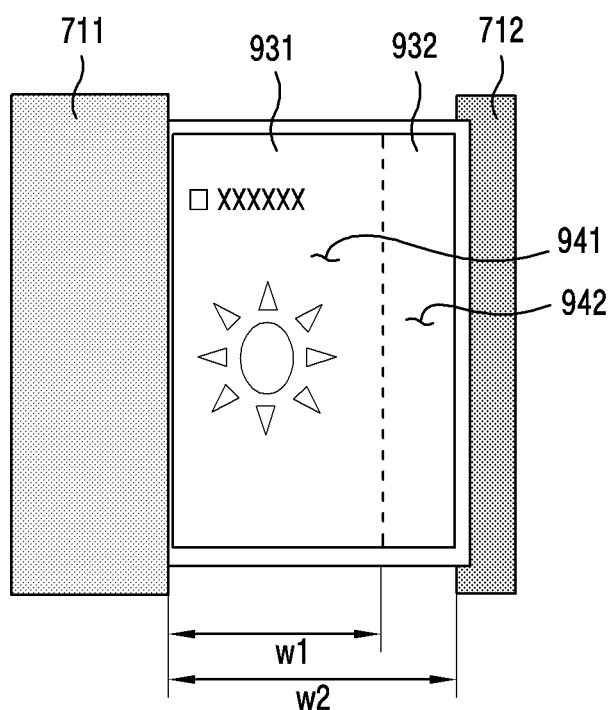
FIG. 9A illustrates an electronic device which reduces an area on which a first content is displayed and displays a UI according to an embodiment.
Figure 9B:
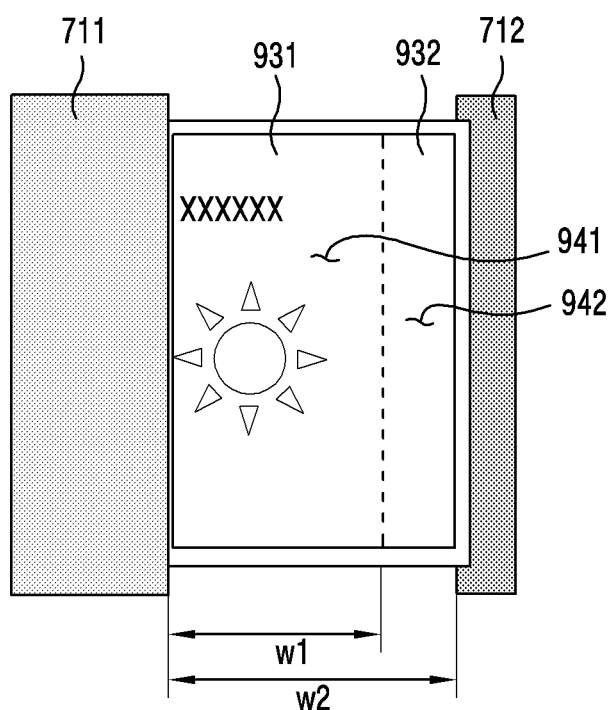
FIG. 9B illustrates an electronic device which moves an area on which a first content is displayed and displays a UI according to an embodiment.
Figure 9C:
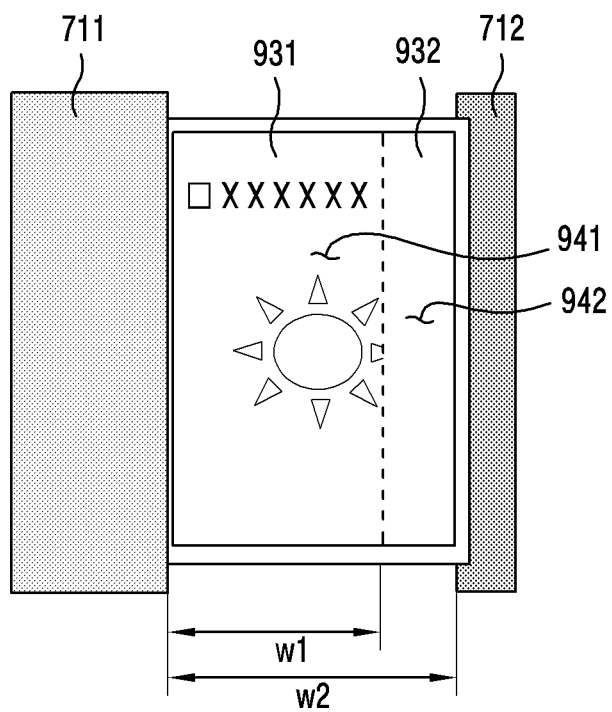
FIG. 9C illustrates an electronic device which displays a UI to overlap an area on which a first content is displayed according to an embodiment.

FIG. 9A illustrates an electronic device which reduces an area on which a first content is displayed, and displays a UI according to an embodiment. FIG. 9B illustrates an electronic device which moves an area on which a first content is displayed and displays a UI according to an embodiment. FIG. 9C illustrates an electronic device which displays a UI to overlap an area on which a first content is displayed according to an embodiment. FIG. 9A to FIG. 9C may be referred to as an embodiment of FIG. 8B.

Referring to FIG. 2, FIG. 8A, FIG. 9A, FIG. 9B, and FIG. 9C together, according to an embodiment, at least one processor 272 may detect a first input via at least one sensor 280 or a display 120. According to an embodiment, in response to the first input, the at least one processor 272 may display a first content 931 in a (1-1)th area 941 of the display 120, and display a UI 932 in a (1-2)th area 942.

Referring to FIG. 2, FIG. 6, and FIG. 9A together, in response to a first input, at least one processor 272 according to an embodiment may reduce a size of the first content 931 and display the UI 932 in the (1-2)th area 942.

Referring to FIG. 2, FIG. 6, and FIG. 9B together, in response to a first input, at least one processor 272 according to an embodiment may move the first content 931 displayed in the (1-1)th area 941 in one direction in the display 120, and display the UI 932 in the (1-2)th area 942. For example, in a case where the first input is detected, the at least one processor 272 may move the first content 931 in a direction adjacent to a first housing 711 by a first distance without resizing any display elements therein (e.g., unlike FIG. 9A in which the display contents are reduced in size), and display the UI 932 in a second area having a first distance from the second housing 712.

Referring to FIG. 2, FIG. 6, and FIG. 9C together, in response to a first input, the at least one processor 272 may display the UI 932 in the (1-2)th area 942 at least partially overlapping the first content 931. For example, in a case where the first input is detected, the at least one processor 272 may display the UI 932 in one area, among the areas where the first content 931 is displayed, so as to be adjacent to the second housing 712 so as to overlap the first content 931.

Figure 10:
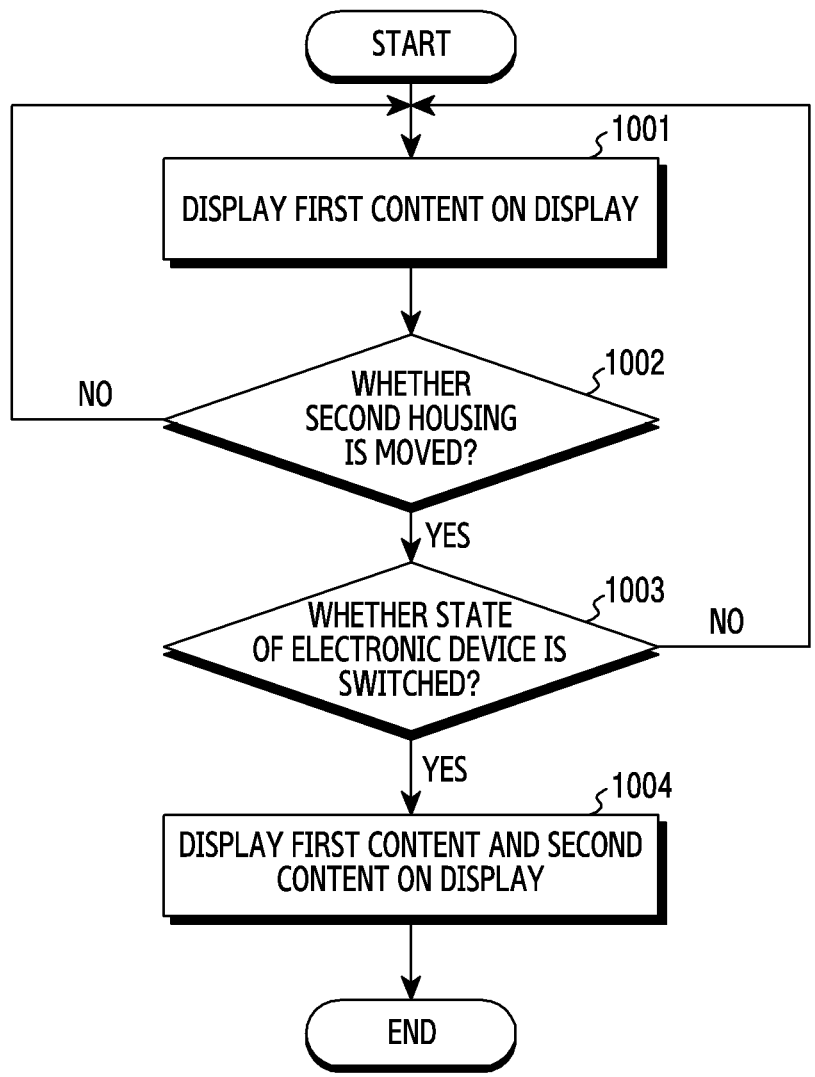
FIG. 10 is a flowchart showing an operation of displaying a first content and a second content on a display depending on the state change of an electronic device according to an embodiment.

FIG. 10 is a flowchart showing an operation of displaying a first content and a second content on a display depending on the state change of an electronic device according to an embodiment.

Referring to FIG. 10, an electronic device according to an embodiment may display a first content and a second content on a display according to the state of the electronic device.

Referring to FIG. 2 and FIG. 10 together, an electronic device according to an embodiment may display a first content and a second content based on a pre-stored input value, with respect to a UI (e.g., the UI 932 of FIG. 9). In operation 1001 according to an embodiment, the electronic device 100 or the at least one processor 272 of the electronic device 100 may display a first content on the display 120. According to an embodiment, in operation 1002, the at least one processor 272 may detect movement of the second housing 112 using the at least one sensor 280. For example, the at least one processor 272 may detect the movement of the second housing 112 by detecting changes in a distance of the second housing 112 with respect to the first housing 111 using a TOF sensor, but is not limited thereto.

According to an embodiment, in operation 1003, the at least one processor 272 may determine whether the state of the electronic device 100 has been changed (e.g., is switched). For example, in a case where the electronic device 100 is a foldable portable terminal, the at least one processor 272 may determine whether the state of the electronic device 100 has been switched from a folded state and an unfolded state. For another example, in a case where the electronic device 100 is a slidable or rollable terminal, the at least one processor 272 may determine whether the state of the electronic device 100 has been changed from a default state to an extended state. For example, the at least one processor 272 may detect an exposed state of the display 120 using a Hall sensor, and may thus detect the state change of the electronic device 100.

According to an embodiment, in a case where the state of the electronic device 100 is not switched (1002—NO), the at least one processor 272 may continue display a first content on the display 120 (1001).

According to an embodiment, in a case where the state of the electronic device 100 is switched from the first state 100a to the second state 100b (1002—YES), then in operation 1004, the at least one processor 272 may display a first content and a second content on the display 120. For example, in a case where the state of the electronic device 100 is switched to the second state 100b, the at least one processor 272 in the first state 100a may display the first content in the first area where the first content has been displayed, and may display the second content in a second area of the extended display 120 except for the first area.

Figure 11A:
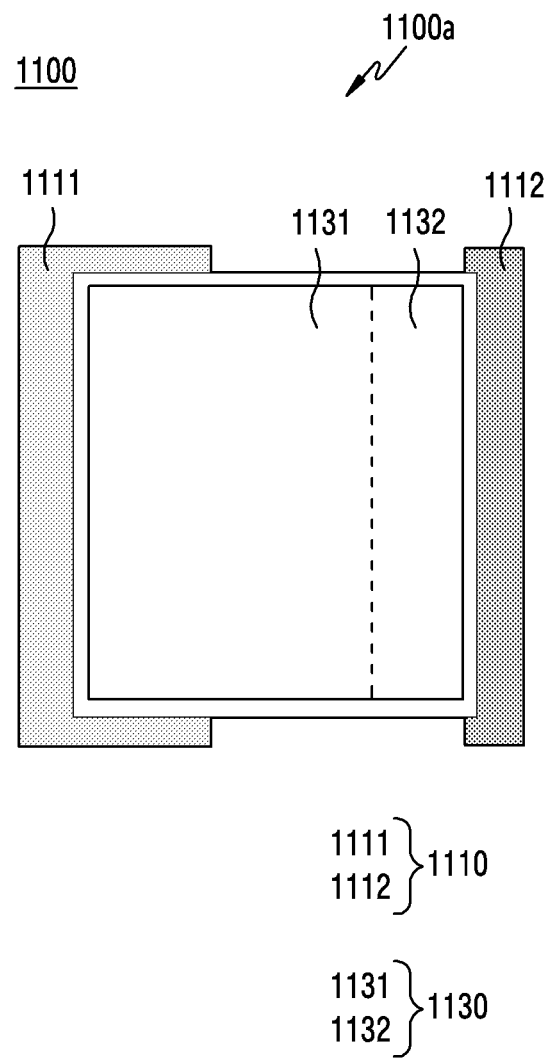
FIG. 11A is a plan view illustrating an electronic device in a first state according to an embodiment.
Figure 11B:
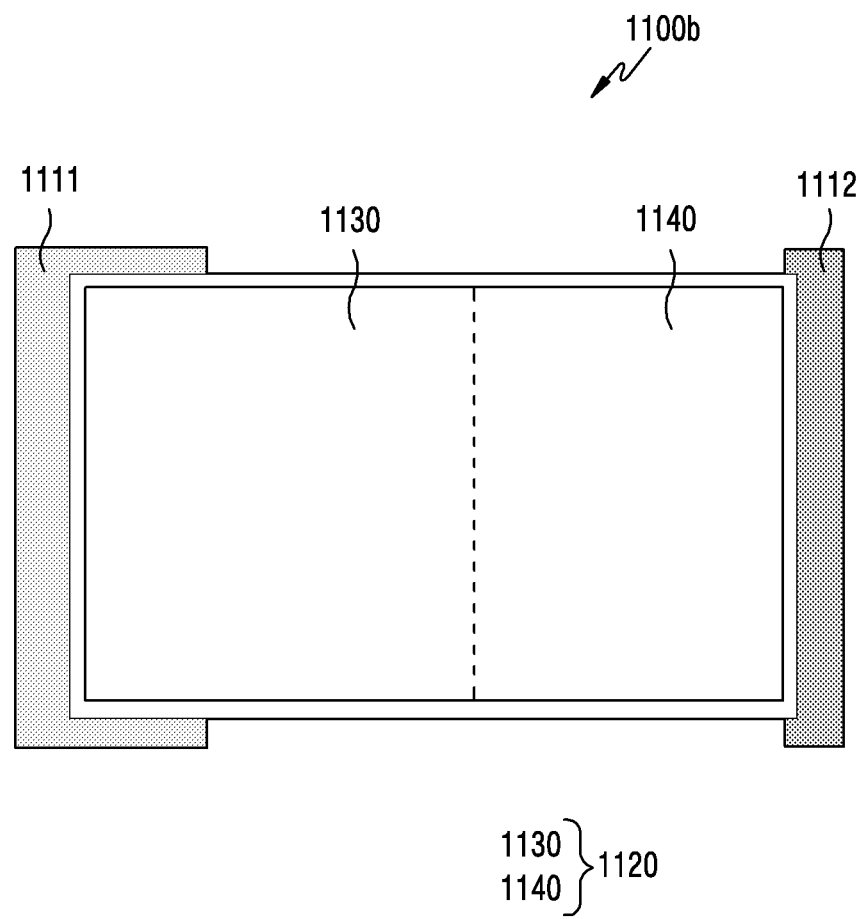
FIG. 11B is a plan view illustrating an electronic device in a second state according to an embodiment.

FIG. 11A is a plan view illustrating an electronic device in a first state according to an embodiment. FIG. 11B is a plan view illustrating an electronic device in a second state according to an embodiment.

Referring to FIG. 11A and FIG. 11B together, an electronic device 1100 according to an embodiment may include a display 1120 and housings 1110 including a first housing 1111 and a second housing 1112 movable with respect to the first housing 1111. The same or similar reference numerals have been used for the elements the same or substantially the same as the elements having the same content described above, and overlapping descriptions may be omitted.

According to an embodiment, the display 1120 may be visible to the exterior environment by a first size in a case where the electronic device 1100 is in a first state 1100a, and may be visible to the exterior environment by a second size greater than the first size in a second state 1100b.

According to an embodiment, the display 1120 may include a (1-1)th area 1131 and a (1-2)th area 1132 in a case where the electronic device 1100 is in the first state 1100a. For example, in the first state 1100a, at least one processor 272 may display a first content in the (1-1)th area 1131 based on a first input of a user, and may display a UI in the (1-2)th area 1132. According to another embodiment, in a case where the electronic device 1100 is in the first state 1100a, the (1-2)th area 1132 of the display 1120 may be omitted.

According to an embodiment, the at least one processor 272 may detect the state change of the electronic device 1100 by using at least one sensor 280. For example, the at least one processor 272 may detect the movement of the second housing 1112 by using the at least one sensor 280, and may detect the state change of the electronic device 1100 according to the movement of the second housing 1112. According to an embodiment, in a case where the electronic device 1100 is switched from the first state 1100a to the second state 1100b, the display 1120 may include a first area 1130 and a second area 1140. For example, in the second state 1100b, the at least one processor 272 may display a first content in the first area 1130, and may display a second content based on a second input in the second area 1140. The description thereof will be given later.

Figure 12A:
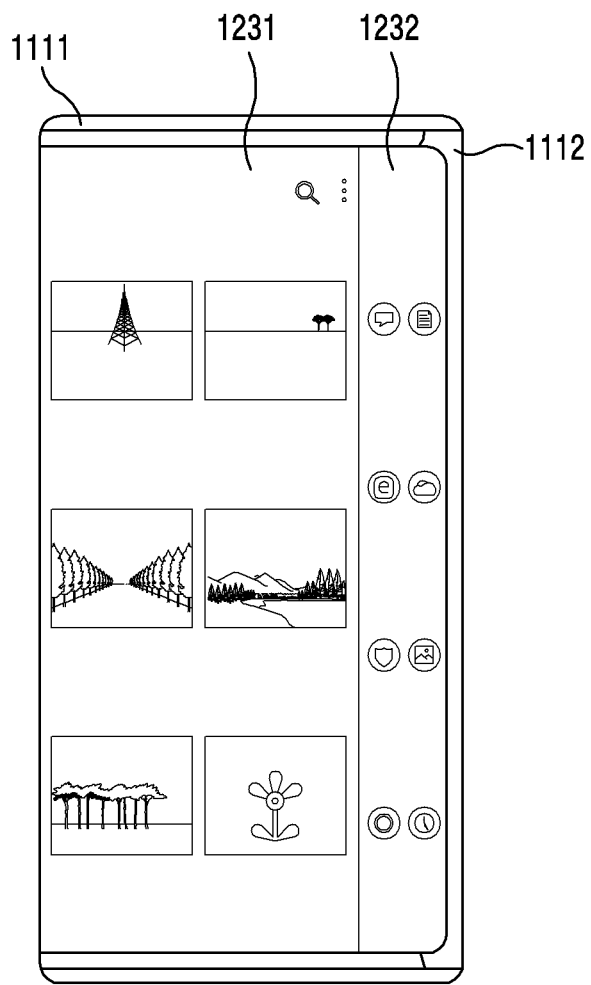
FIG. 12A illustrates an electronic device for displaying a first content and a UI according to an embodiment.
Figure 12B:
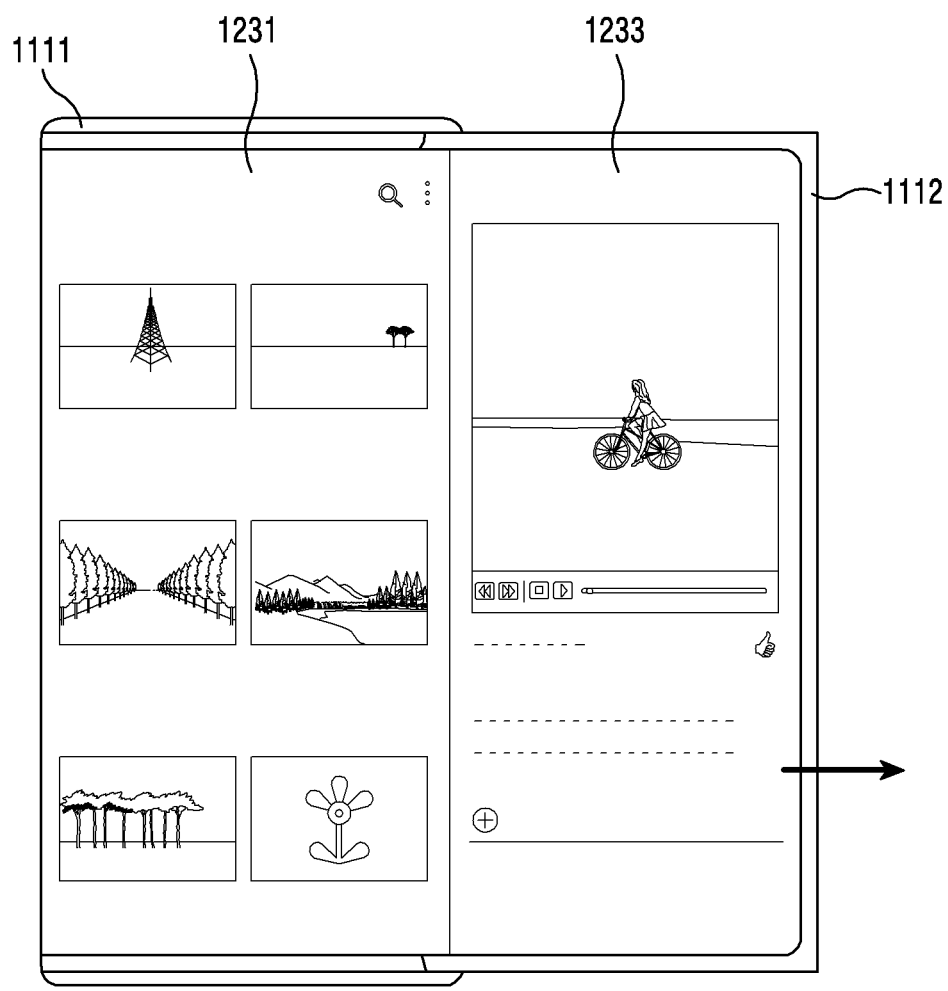
FIG. 12B illustrates an electronic device for displaying a first content and a second content depending on the state change of an electronic device according to an embodiment.

FIG. 12A illustrates an electronic device for displaying a first content and a UI according to an embodiment. FIG. 12B illustrates an electronic device for displaying a first content and a second content depending on the state change of an electronic device according to an embodiment.

Referring to FIG. 12A and FIG. 12B together, an electronic device 1100 according to an embodiment may detect a first input of a user. The electronic device 1100 according to an embodiment may be switched from the first state 1100a to the second state 1100b in response to an input. According to an embodiment, a display 1120 of the electronic device 1100 may be visible to the exterior environment of the electronic device 1100 by a first size in the first state 1100a. According to an embodiment, the display 1120 of the electronic device 1100 may be visible to the exterior environment of the electronic device 1100 by a second size extending from the first size in the second state 1100b.

Referring to FIG. 11A and FIG. 12A together, an electronic device 1100 according to an embodiment may include a first housing 1111, a second housing 1112 movable with respect to the first housing 1111, and a display 1120. According to an embodiment, the electronic device 1100 may display a first content 1231 and/or a UI 1232 on the display 1120 in the first state 1100a based on a first input. According to an embodiment, the UI 1232 may include at least one among an executable application icon, summary information, or a preview, but is not limited thereto. According to another embodiment, in a case where the electronic device 1100 is in the first state 1100a, the electronic device 1100 may display the first content 1231 having a first size on the display 1120.

Referring to FIG. 11B and FIG. 12B together, an electronic device 1100 according to an embodiment may include a first housing 1111, a second housing 1112 movable with respect to the first housing 1111, and a display 1120. According to an embodiment, the electronic device 1100 may display a first content 1231 and/or a second content 1233, based on the input to the UI 1232 in a second area of the display 1120 in the second state 1100*b*. According to an embodiment, the second content 1233 may include at least one of image information and a graphic user inter face (GUI), but is not limited thereto. According to another embodiment, in a case where the electronic device 1100 is in the second state 1100*b*, the electronic device 1100 may display the first content 1231 having a second size on the display 1120.

Figure 13:
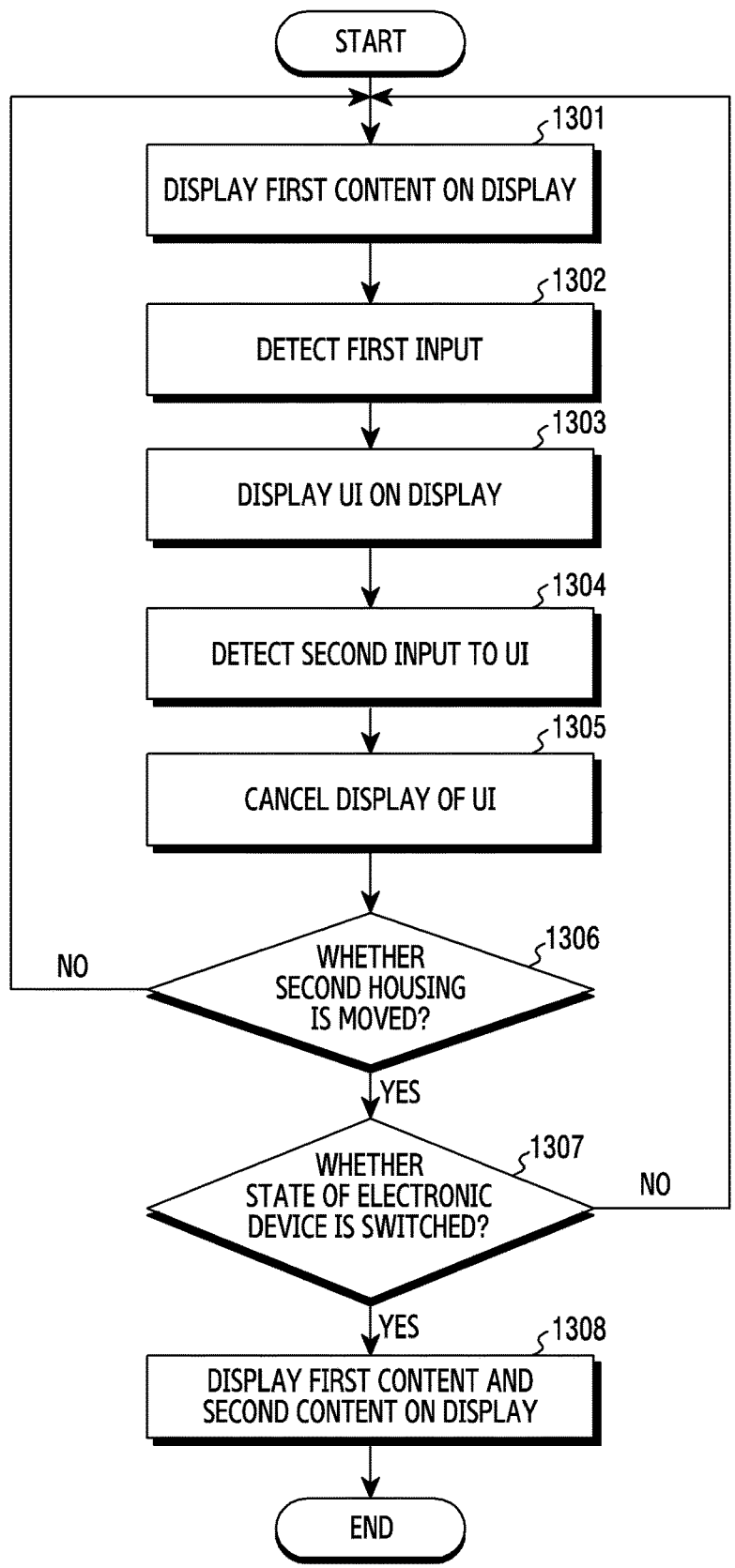
FIG. 13 is a flowchart showing operations of displaying a UI depending on an input of a user and displaying content depending on the state of an electronic device according to an embodiment.

FIG. 13 is a flowchart showing operations of displaying a UI depending on an input of a user and displaying content depending on the state of an electronic device according to an embodiment. The operations described in FIG. 13 may be understood to be performed by any one of the electronic devices according to certain embodiments described above.

Referring to FIG. 13, an electronic device (e.g., the electronic device 100 of FIG. 1) according to an embodiment may display a UI in response to an input, and according to the state change of the electronic device, display a second content based on the input.

According to an embodiment, in operation 1301, the electronic device may display a first content on a display. According to an embodiment, the electronic device may display the first content in a (1-1)th area (e.g., the (1-1)th area 941 of FIG. 9) of the display. According to an embodiment, in operation 1302, the electronic device may detect a first input by using at least one sensor. According to another embodiment, the electronic device may detect a first input via at least one sensor (e.g., a touch sensor) included in the display.

According to an embodiment, in operation 1303, the electronic device may display a UI in a second area of the display in response to a first input. For example, the UI may include at least one among a sliding menu including multiple apps therein, an executable application icon and a preview, but is not limited thereto.

According to an embodiment, in operation 1304, the electronic device may detect a second input to the UI. According to an embodiment, the electronic device may store information on a second input to the UI in a memory (not shown). According to an embodiment, in operation 1305, the electronic device may cancel the displaying of the UI on the display in response to the second input. According to another embodiment, a part (e.g., operation 1305) of the above-described operations may be omitted, or a part of the operations may be added.

According to an embodiment, the electronic device may detect movement of the second housing in operation 1306. According to an embodiment, the electronic device may detect the movement of a second housing using at least one sensor. For example, the electronic device may detect the movement of the second housing by detecting changes in the distance of the second housing with respect to the first housing by using a TOF sensor. According to an embodiment, in a case where the movement of the second housing is detected in operation 1306, determining whether the state of the electronic device is switched may be executed in operation 1307. According to an embodiment, in a case where the movement of the second housing is not detected in operation 1306 (1306—NO), a first content may be displayed in a display (1301).

According to an embodiment, in operation 1307, at least one processor may determine whether the state of the electronic device is switched. According to an embodiment, the at least one processor may determine the state of the electronic device in operation 1307, based on the detection result in operation 1306. According to an embodiment, in a case where the state of the electronic device is not switched, the at least one processor may display a first content on the display (1307—NO). According to an embodiment, in a case where an electronic device (e.g., the electronic device 100 of FIG. 1) is a foldable terminal, the at least one processor may determine whether the state thereof is switched between a folded state and an unfolded state. According to another embodiment, in a case where an electronic device is a slidable or rollable terminal, the at least one processor may determine the state thereof is switched between a default state and an extended state.

According to an embodiment, in a case where the state of an electronic device is switched from a first state to a second state (1307—YES), at least one processor may display a first content and/or a second content on a display in operation 1308. According to an embodiment, in a case where the electronic device is in a second state, the at least one processor may display a first content in a first area in operation 1308, and may display a second content based on a second input in a second area. For example, in a case where the electronic device is switched in a second state, the at least one processor may display a first content in a first area in which the first content has been displayed in a first state, and may display a second content in a second area of an extended display. According to an embodiment, in a case where the electronic device is in a second state, the at least one processor may display a second content in a second area based on the information on a second input stored in a memory.

Figure 14A:
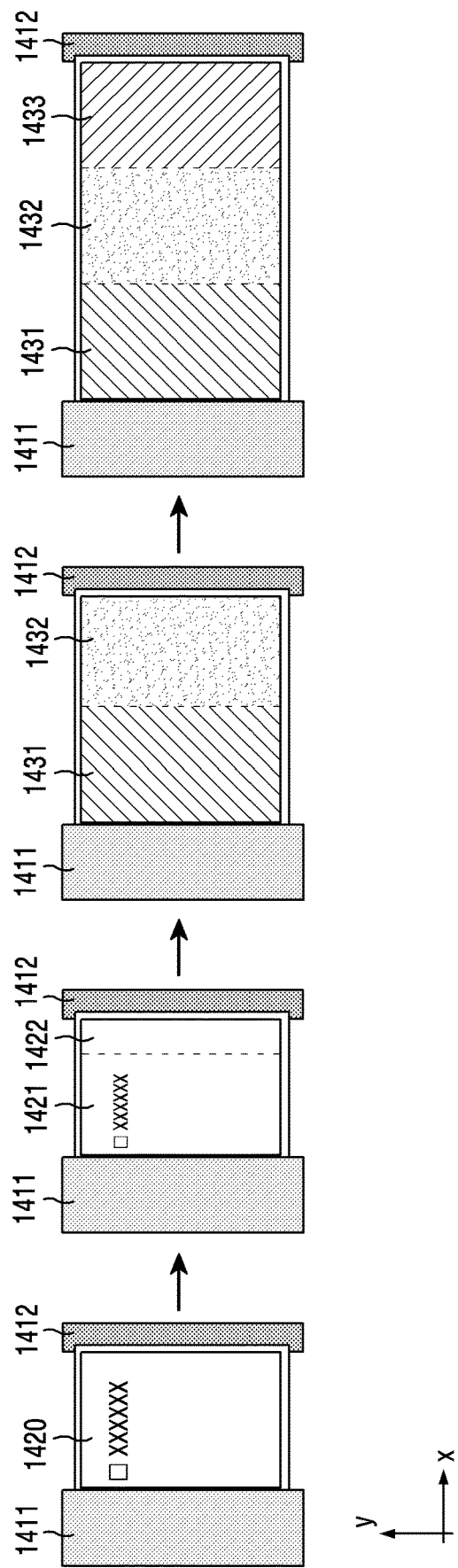
FIG. 14A illustrates an electronic device in which a second housing moves in a first direction to extend a display area according to an embodiment.
Figure 14B:
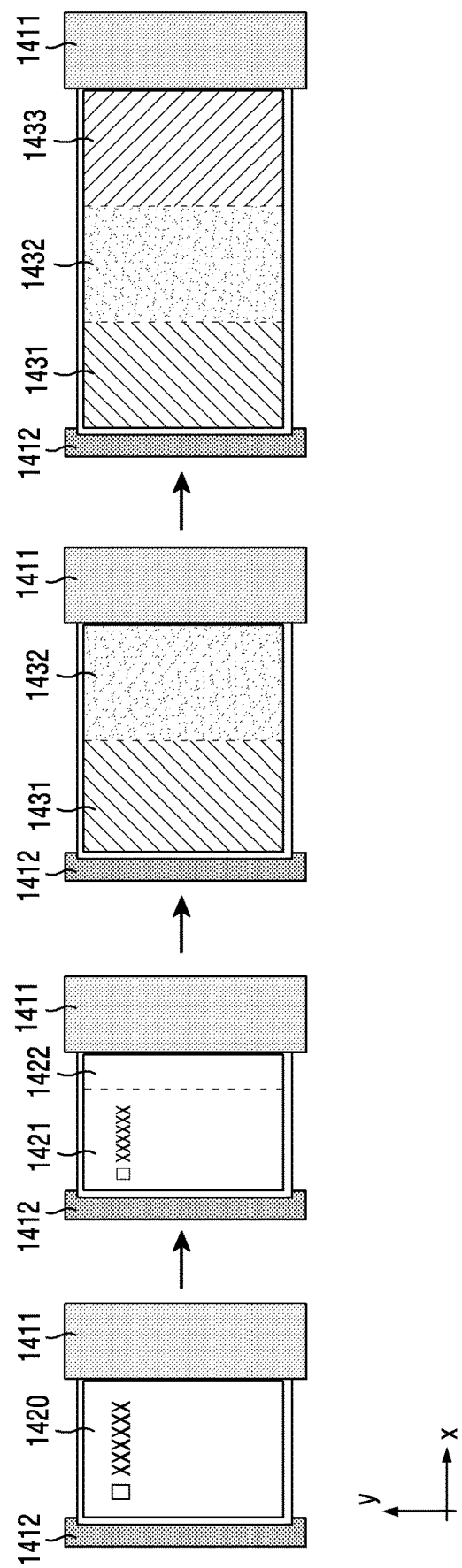
FIG. 14B illustrates an electronic device in which a second housing moves in a second direction to extend a display area according to an embodiment.

FIG. 14A illustrates an electronic device in which a second housing moves in a first direction to extend a display area according to an embodiment. FIG. 14B illustrates an electronic device in which a second housing moves in a second direction to extend a display area according to an embodiment.

Referring to FIG. 14A and FIG. 14B together, according to an embodiment, an electronic device may form an area of a display 1420, regardless of a movement direction of a second housing 1412. According to an embodiment, an electronic device may include a first housing 1411, a second housing 1412 movable with respect to the first housing 1411, and a display 1420. The same or similar reference numerals have been used for the elements the same or substantially the same as the elements having the same content described above, and overlapping descriptions may be omitted.

According to an embodiment, at least one processor may display a first content on the display 1420. According to an embodiment, in a case where a first input is detected, the display 1420 may include a (1-1)th area(1421) and a (1-2)th area 1422. According to an embodiment, the size or location of the (1-1)th area 1421 and the (1-2)th area 1422 may be variable. For example, in a case where a first input is detected, the at least one processor may display a first content in the (1-1)th area(1421) and may display a UI in the (1-2)th area 1422.

Referring to FIG. 11A, FIG. 11B, and FIG. 14A together, the electronic device 1100 may be switched from the first state 1100*a* to the second state 1100*b* by movement of the second housing 1142 in a first direction (e.g., +X direction). According to an embodiment, in a case where the electronic device 1100 is switched from the first state 1100*a* to the second state 1100*b*, the display 1420 may include a first area 1431 adjacent to the first housing 1411, a second area 1432 extending from a first periphery of the first area 1431 which is not adjacent to the first housing 1411, and a third area 1433 extending from the second area 1432 and adjacent to the second housing 1412. For example, the second area 1432 may be positioned between the first area 1431 and the third area 1433. According to another embodiment, a part (e.g., the third area 1433) of the above-described configuration may be omitted according to the state of the electronic device 1100.

Referring to FIG. 11A, FIG. 11B, and FIG. 14B together, the electronic device 1100 may be switched from the first state 1100a to the second state 1100b by the movement of the second housing 1142 in a second direction (e.g., −X direction). According to an embodiment, in a case where the electronic device 1100 is switched from the first state 1100a to the second state 1100b, a display 1420 may include a first area 1431 adjacent to the second housing 1412, a second area 1432 extending from a first periphery of the first area 1431 which is not adjacent to the second housing 1412, and a third area 1433 extending from the second area 1432 and adjacent to the first housing 1411. For example, the second area 1432 may be positioned between the first area 1431 and the third area 1433. According to another embodiment, a part (e.g., the third area 1433) of the above-described configuration may be omitted according to the state of the electronic device 1100.

Figure 15:
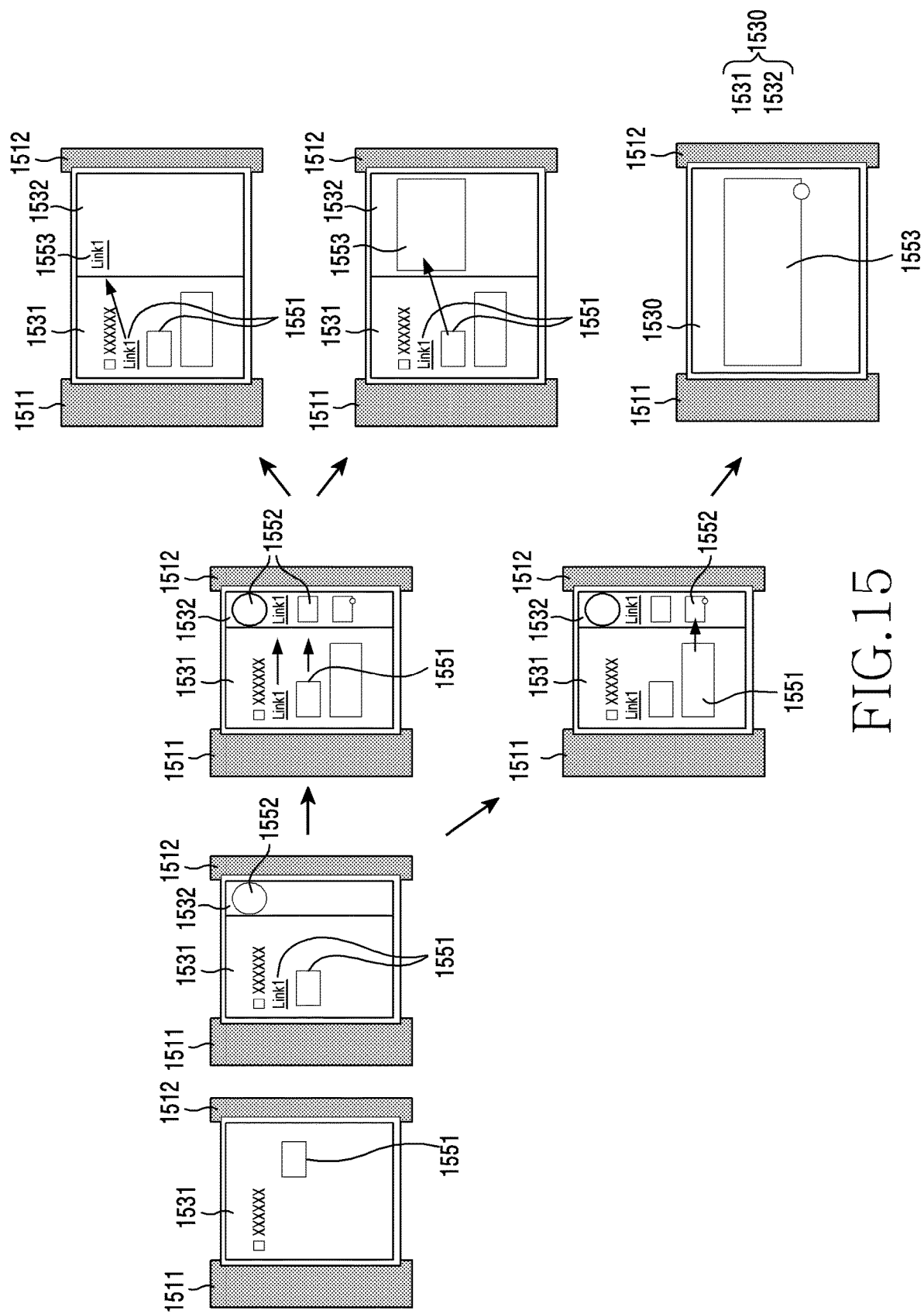
FIG. 15 illustrates an electronic device in which a part of a first content is displayed as a preview according to an embodiment.

FIG. 15 illustrates an electronic device in which a part of a first content is displayed as a preview according to an embodiment.

Referring to FIG. 15, an electronic device (e.g., the electronic device 100 of FIG. 1) according to an embodiment may include a first housing 1511 (e.g., the first housing 1411 of FIG. 14), a second housing 1512 (e.g., the second housing 1412 of FIG. 14), a first content 1551, a second content 1553, and a preview content 1552.

According to an embodiment, at least one processor (e.g., the processor 272 of FIG. 2) may display the first content 1551 on a (1-1)th area(1531). For example, the first content 1551 may include at least one among an icon and a link, but is not limited thereto.

Referring to FIG. 9A to FIG. 9C and FIG. 15 together, at least one processor according to an embodiment may include a UI in a (1-2)th area 1532 in response to a first input. According to an embodiment, the UI may include the preview content 1552 based on the first content 1551. For example, the preview content 1552 may include display of an icon, representing some content included among the first content 1551 that is reduced in size. For example, the UI may include the preview content 1552, in which a link is moved, among the first content 1551.

According to an embodiment, at least one processor may extend a display area visible to the exterior environment of an electronic device in response to a second input. According to an embodiment, the at least one processor may display the second content 1553 based on a user input selecting the preview content 1552 in a second area 1532 after extending the display area. For example, in a case where an input, selecting a preview of the link in the UI, is received in the pre-extension state, the content related to the link may be displayed in the second area 1532. For example, in a case where an icon previewing some content in the UI is selected, the content related to the icon may be displayed in the second area 1532. According to another embodiment, the at least one processor may display the second content 1553 on a display 1530 after extending the display area.

Figure 16:
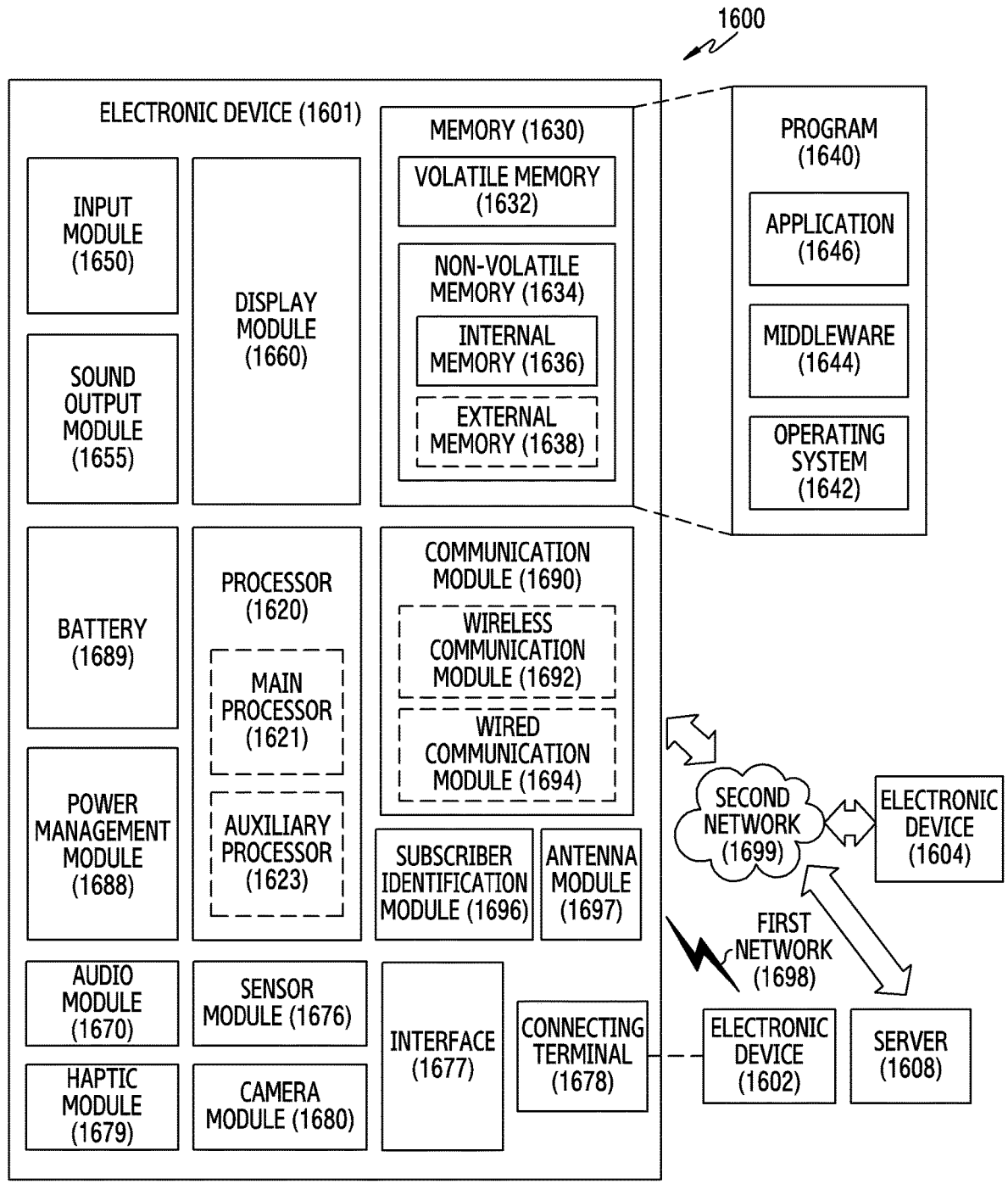
FIG. 16 is a block diagram of an electronic device in a network environment according to certain embodiments.

FIG. 16 is a block diagram illustrating an electronic device 1601 in a network environment 1600 according to certain embodiments. Referring to FIG. 16, the electronic device 1601 in the network environment 1600 may communicate with an electronic device 1602 via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 880, a power management module 1688, a battery 1689, a communication module 1690, a subscriber identification module(SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to an embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thererto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the exterior environment (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the exterior environment of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the exterior environment (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 888 may manage power supplied to the electronic device 1601. According to an embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the exterior environment (e.g., the external electronic device) of the electronic device 1601. According to an embodiment, the antenna module 1697 may include an antenna including a radiating element implemented using a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

According to certain embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively, or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device according to an embodiment may include housings including a first housing and a second housing coupled to the first housing to be movable with respect to the first housing, a flexible display including an exposure area visible to the exterior environment of the electronic device via a front surface of the electronic device, the exposure area having a first size in a case where the electronic device is in a first state and having a second size larger than the first size in a case where the electronic device is switched from the first state to a second state, at least one sensor disposed in the housings, and at least one processor electrically connected to the at least one sensor, wherein in a case where the electronic device is in the first state, the at least one processor displays a first content in the flexible display, detects a first input by using the at least one sensor, in response to the detected result, displays a user interface (UI) along with or on the first content on the flexible display, in response to a second input to the UI, cancels the displaying of the UI, and in a case where the electronic device is switched to the second state, displays a first content in a first area of the exposure area and displays a second content based on the second input and distinguished from the first content in a second area of the exposure area.

According to an embodiment, at least one processor may detect the first input corresponding to the predetermined pattern by using the at least one sensor.

According to an embodiment, the at least one processor may detect the first input maintained for a predetermined time or longer with respect to the second housing by using the at least one sensor.

According to an embodiment, the at least one processor may detect the first input having a pressure value equal to or greater than a predetermined pressure value by using the at least one sensor.

According to an embodiment, the UI may include at least one icon for an executable application in the second state.

At least one processor according to an embodiment may reduce an area where the first content is displayed in response to the first input, and display the UI on an area except for the area of the flexible display.

According to an embodiment, the electronic device may include a memory electrically connected to the at least one processor, wherein the at least one processor stores the information on the second input in the memory in response to the second input, and in a case where the electronic device is switched to a second state, may display the first content and the second content on the flexible display based on the information.

An electronic device according to an embodiment may include housings including a first housing and a second housing coupled to the first housing to be movable with respect to the first housing, a flexible display having a first portion visible to the exterior environment of the electronic device via a front surface of the electronic device, the flexible display having a second portion extending from the first portion such that the second portion is withdrawn from the interior of the first housing when the electronic device is switched from the first state to a second state and the second portion is inserted into the first housing when the electronic device is switched from the second state to the first state, at least one sensor disposed in the housings, and at least one processor electrically connected to the at least one sensor, wherein in a case where the electronic device is in the first state, the at least one processor displays a first content in the first portion, detects a first input by using the at least one sensor, in response to the detected result, displays a UI along with or on the first content on the first portion, in response to a second input to the UI, cancels the displaying of the UI, detects the movement of the second housing by using the at least one sensor, and in a case where the electronic device is switched to the second state according to the movement of the second housing, displays the first content on at least a part of the second portion based on the second input and displays a second content on at least a part of the first portion.

According to an embodiment, the UI may include at least one icon for an executable application in the second state.

Sensors according to an embodiment may include a first sensor for detecting the first input and a second sensor for detecting the movement of the second housing, the second sensor being distinguished from the first sensor.

According to an embodiment, at least one processor may detect a first input maintained for a predetermined time or longer with respect to the second housing by using the first sensor.

According to an embodiment, the at least one processor may detect a first input corresponding to a pre-stored pattern by using the first sensor.

According to an embodiment, the second sensor may include at least one among a time of flight (TOF) sensor or a Hall sensor.

A processor according to an embodiment may reduce an area in which the first content is displayed in response to the first input, and may display the UI in an area of the flexible display except for the area where the first content is displayed.

According to an embodiment, the electronic device may include a memory electrically connected to the at least one processor, wherein the at least one processor stores the information on the second input in the memory in response to the second input, and in a case where the electronic device is switched to a second state, may display the first content and the second content on the flexible display based on the information.

An electronic device according to an embodiment may include housings including a first housing and a second housing coupled to the first housing to be movable with respect to the first housing, a flexible display including an exposure area visible to the exterior environment of the electronic device via a front surface of the electronic device, the exposure area having a first size in a case where the electronic device is in a first state and having a second size larger than the first size in a case where the electronic device is switched from the first state to a second state, at least one sensor disposed in the housings, and at least one processor electrically connected to the at least one sensor, wherein in a case where the electronic device is in the first state, the at least one processor displays a first content in the flexible display, detects a first input by using the at least one sensor, in response to the detected result, displays a user interface (UI) along with or on the first content on the flexible display, in response to a second input to the UI, moves the second housing to switch the electronic device to a second state, cancels the displaying of the UI, displays the first content in a first area of the exposure area, and displays a second content based on the second input and distinguished from the first content in a second area of the exposure area.

According to an embodiment, the electronic device may further include a driving unit, and the at least one processor may control the driving unit in response to the second input, and may thus move the second housing to switch the state of the electronic device to the second state.

According to an embodiment, the electronic device may further include a memory electrically connected to the at least one processor, wherein in a case where the electronic device is switched to a second state, the processor displays the first content on at least a part of the second portion based on a configuration value stored in the memory, and display a second content on at least a part of the first portion.

According to an embodiment, the at least one processor may detect a first input maintained for a predetermined time or longer with respect to the second housing by using the sensor.

According to an embodiment, the at least one processor may detect a first input corresponding to a pattern stored in the memory by using the sensor.

What is claimed is:

1. An electronic device, comprising:
   housings, including a first housing and a second housing coupled to the first housing, the second housing movable with respect to the first housing;
   a flexible display including an exposure area visible from an exterior environment of the electronic device via a front surface of the electronic device;
   at least one sensor disposed in at least one of the housings;
   a processor, and
   memory storing instructions that, when executed by the processor, cause the electronic device to:
   based on detecting that the exposure area of the flexible display corresponds to a first size, display a first content in the flexible display;
   detect a first input via the at least one sensor, the first input comprising a touch input at an area of the second housing;
   in response to detecting the first input, display a user interface (UI) along with or at least partly over the first content, while the flexible display is the first size;
   detect a second input to the UI;
   in response to detecting the second input to the UI, cancel display of the UI; and
   based on detecting that the exposure area of the flexible display corresponds to a second size larger than the first size, maintain display of the first content in a first area of the exposure area, and display a second content based on the second input in a second area of the exposure area,
   wherein the at least one sensor includes a sensing pattern that is configured to detect touching of the area of the second housing that is adjacent to the flexible display.

2. The electronic device of claim 1, wherein the instructions, when executed by the processor, cause the electronic device to:
   receive a user input via at least one sensor;
   extract a first pattern from the user input;
   determine whether the extracted first pattern corresponds to a pre-stored pattern; and
   based on detecting that the user input comprises a touch input at the area of the second housing and the extracted first pattern corresponds to the pre-stored pattern, determine that the first input is detected via the user input.

3. The electronic device of claim 1, wherein the instructions, when executed by the processor, cause the electronic device to:
  determining whether a user input is maintained for at least a predetermined time; and
  based on determining that the user input comprises a touch input at the area of the second housing and is maintained for the at least the predetermined time, determining that the first input is detected via the user input.

4. The electronic device of claim 1, wherein the instructions, when executed by the processor, cause the electronic device to:
  detect a user input via the at least one sensor;
  determine whether a pressure applied via the user input is at least a predetermined pressure value; and
  based on detecting that the user input comprises a touch input at the area of the second housing and the pressure applied is at least the predetermined pressure value, determining that the first input is detected via the user input.

5. The electronic device of claim 1, wherein the UI includes at least one icon corresponding to an executable application.

6. The electronic device of claim 1, wherein the instructions, when executed by the processor, cause the electronic device to:
  in response to detecting the first input, reduce a first display area in which the first content is displayed; and
  display the UI in a region from which the first display area was removed by the reduction.

7. The electronic device of claim 1,
  wherein the instructions, when executed by the processor, cause the electronic device to:
  in response to detecting the second input, store information of the second input in the memory; and
  when detecting that the exposure area of the flexible display changes from the first size to the second size, based on the stored information, display the first content and the second content on the flexible display.

8. The electronic device of claim 1, wherein the flexible display further includes:
  a first portion visible to the exterior environment of the electronic device via a front surface of the electronic device, and a second portion extending from the first portion,
  wherein the second portion is extracted from an interior of the first housing when the exposure area of the flexible display changes from the first size to the second size, and
  wherein the second portion is stowed within the first housing when the exposure area of the flexible display changes from the second size to the first size.

9. The electronic device of claim 8, wherein the electronic device further includes a driving unit, and
  wherein the instructions, when executed by the processor, cause the electronic device to: in response to detecting the second input, activate the driving unit so as to move the second housing to drive the exposure area of the flexible display to change from the first size to the second size.

10. The electronic device of claim 8, wherein the at least one sensor includes multiple sensors, including a first sensor configured to detect the first input, and a second sensor configured to detect a movement of the second housing.

11. The electronic device of claim 10, wherein the instructions, when executed by the processor, cause the electronic device to:
  receive a user input via the first sensor;
  extract a first pattern from the user input;
  determine whether the extracted first pattern corresponds to a pre-stored pattern; and
  based on detecting that the user input comprises a touch input at the area of the second housing and that the extracted first pattern corresponds to the pre-stored pattern, determine that the first input is detected via the user input.

12. The electronic device of claim 10, wherein the second sensor includes at least one among a time of flight (TOF) sensor or a Hall sensor.

13. The electronic device of claim 8, wherein the instructors, when executed by the processor, cause the electronic device to:
  in response to the first input, reduce a size of a first area in which the first content is displayed; and
  display the UI in a second area of the flexible display excepting the first area in which the first content is maintained in display.

14. The electronic device of claim 8,
  wherein the instructions, when executed by the processor, cause the electronic device to:
  in response to detecting the second input, store information of the second input in the memory; and
  in response to detecting that the exposure area of the flexible display changes from the second size to the first size, based on the information, display the first content and the second content on the flexible display.

15. A method in an electronic device having a first and a second housing, the method comprising:
  based detecting, via processor of the electronic device, that an exposure area of a flexible display which is visible from an exterior environment of the electronic device via a front surface of the electronic device corresponds to a first size, displaying on the flexible display a first content;
  detecting, via at least one sensor including a sensing pattern that is configured to detect touching of an area of the second housing that is adjacent to the flexible display, a first input, the first input comprising a touch input at the area of the second housing; ,
  in response to detecting the first input, display, on the flexible display, a user interface (UI) with or at least partly overlaying the first content, while the flexible display is the first size;
  detecting a second input to the UI;
  in response to detecting the second input to the UI, cancelling display of the UI; and
  based on detecting that the exposure area of the flexible display corresponds to a second size larger than the first size, maintaining display of the first content in a first area of the exposure area, and displaying a second content based on the second input in a second area of the exposure area.

16. The method of claim 15, wherein detecting the first input further comprises:
  receiving a user input via at least one sensor;
  extracting a first pattern from the user input;
  determining whether the extracted first pattern corresponds to a pre-stored pattern; and
  based on detecting that the user input comprises a touch input at the area of the second housing and the extracted first pattern corresponds to the pre-stored pattern, determining that the first input is detected via the user input.

17. The method of claim 15, wherein detecting the first input includes:
    determining whether a user input is maintained for at least a predetermined time; and
    based on determining that the user input comprises a touch input at the area of the second housing and is maintained for the at least the predetermined time, determining that the first input is detected via the user input.

18. The method of claim 15, wherein detecting the first input includes:
    detect a user input via the at least one sensor;
    determine whether a pressure applied via the user input is at least a predetermined pressure value; and
    based on detecting that the user input comprises a touch input at the area of the second housing and the pressure applied is at least the predetermined pressure value, determining that the first input is detected via the user input.

19. The method of claim 15, wherein the UI includes at least one icon corresponding to an executable application.

* * * * *